(12) United States Patent
Mitani

(10) Patent No.: US 11,702,489 B2
(45) Date of Patent: Jul. 18, 2023

(54) PRODUCTION METHOD OF PROPYLENE POLYMER

(71) Applicant: Sumitomo Chemical Company, Limited, Tokyo (JP)

(72) Inventor: Takayuki Mitani, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 201 days.

(21) Appl. No.: 17/169,620

(22) Filed: Feb. 8, 2021

(65) Prior Publication Data
US 2021/0253756 A1    Aug. 19, 2021

(30) Foreign Application Priority Data
Feb. 14, 2020 (JP) ................. 2020-023720

(51) Int. Cl.
| | |
|---|---|
| C08L 23/14 | (2006.01) |
| C08F 210/16 | (2006.01) |
| C08F 2/01 | (2006.01) |
| C08F 210/06 | (2006.01) |
| C08F 10/06 | (2006.01) |
| C08F 2/34 | (2006.01) |
| C08L 23/08 | (2006.01) |
| C08F 2/00 | (2006.01) |

(52) U.S. Cl.
CPC ............ *C08F 210/06* (2013.01); *C08F 2/001* (2013.01); *C08F 2/34* (2013.01); *C08F 10/06* (2013.01); *C08F 210/16* (2013.01); *C08L 23/0815* (2013.01); *C08L 2207/02* (2013.01)

(58) Field of Classification Search
CPC .. C08F 210/16; C08F 2/34; C08F 2/01; C08F 2/001; C08L 23/10; C08L 23/14; C08L 23/142; C08L 23/12; C08L 2207/02
See application file for complete search history.

(56) References Cited

U.S. PATENT DOCUMENTS

2009/0234076 A1   9/2009   Yada
2017/0291970 A1   10/2017   Itoguchi et al.

FOREIGN PATENT DOCUMENTS

| EP | 2497786 A1 | 9/2012 | |
| JP | H10168142 A | 6/1998 | |
| JP | 2005220235 A | 8/2005 | |
| JP | 2008247999 A | 10/2008 | |
| WO | WO 2008/015113 A2 * | 2/2008 | ............ C08F 210/06 |

OTHER PUBLICATIONS

Extended European Search Report dated Aug. 30, 2021 in EP Application No. 21152666.0.

* cited by examiner

*Primary Examiner* — Rip A Lee
(74) *Attorney, Agent, or Firm* — Panitch Schwarze Belisario & Nadel LLP

(57) ABSTRACT

A method capable of stably performing continuous production of a propylene polymer with high productivity while reducing generation of agglomerates is described. In the method, a monomer(s) containing propylene is/are (co) polymerized in a presence of an olefin polymerization catalyst with a polymerization system containing two or more gas phase polymerization reactors or a polymerization system containing a liquid phase polymerization reactor(s) and a gas phase polymerization reactor(s) such that that the total number of liquid phase polymerization reactor(s) and gas phase polymerization reactor(s) is three or more. In at least one gas phase polymerization reactor, an average retention time $\tau_G$ [hour] in the gas phase polymerization, an average particle diameter $D_{pi}$ [μm] of fed powder, and a total amount $C_o$ [wt %] of an ethylene-derived structural unit and C4-C12 α-olefin-derived structural units in a polymer in discharged powder are in a predetermined relationship.

7 Claims, 2 Drawing Sheets

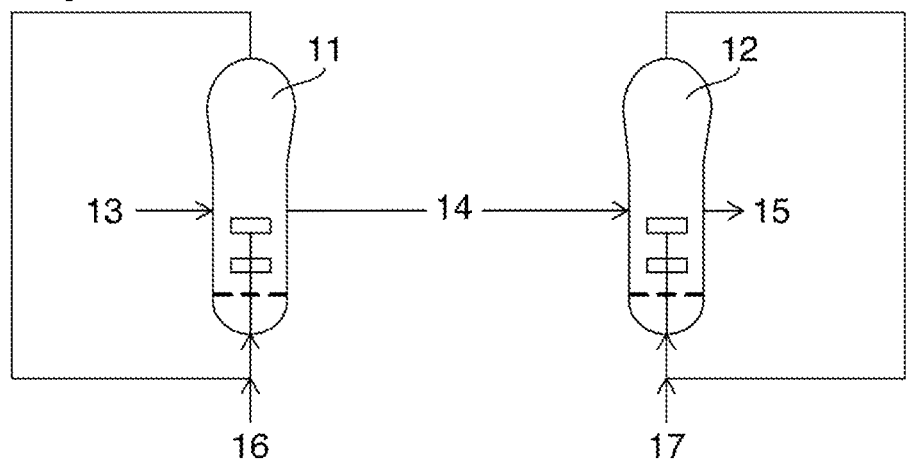
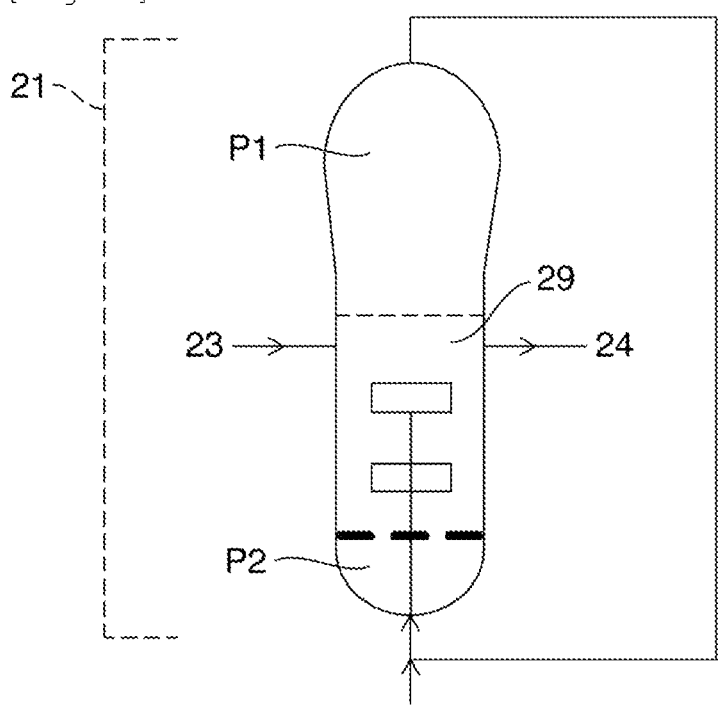

[Fig. 3]
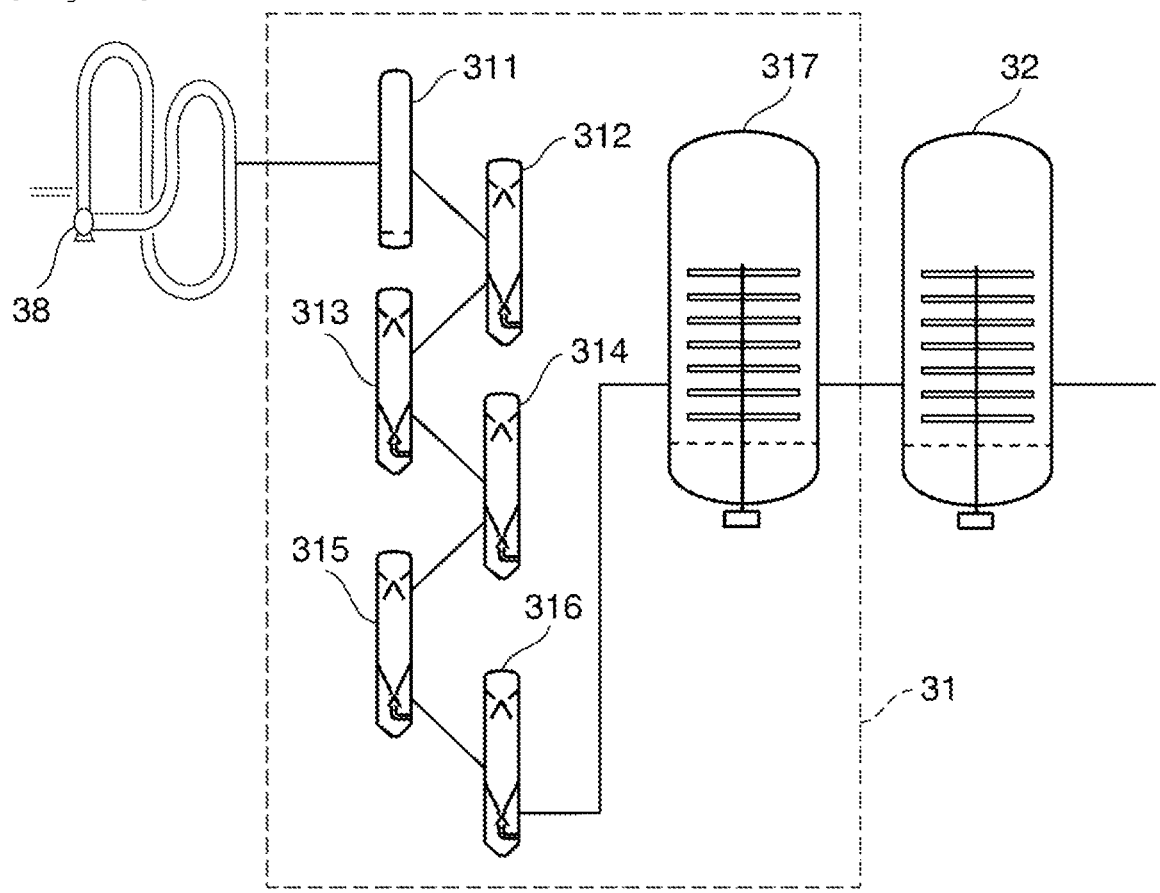
[Fig. 4]
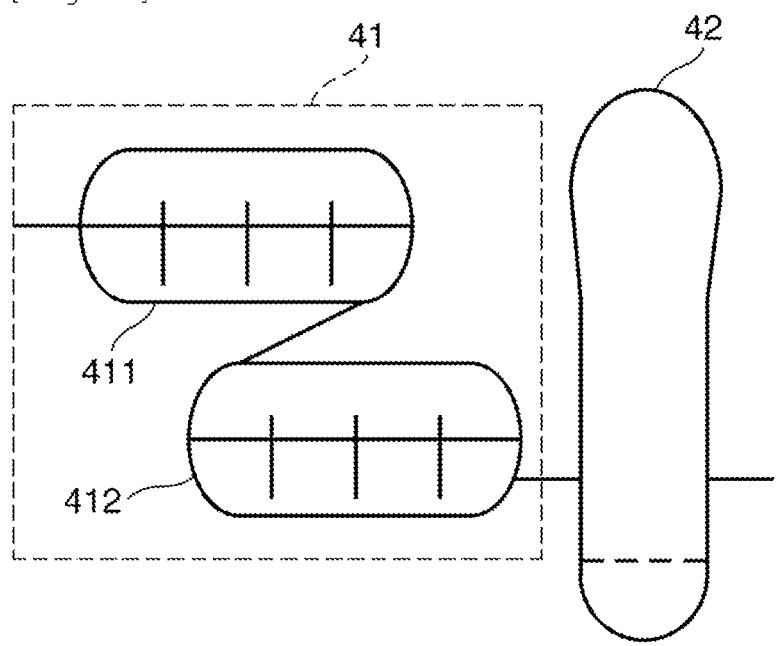

PRODUCTION METHOD OF PROPYLENE POLYMER

CROSS-REFERENCE TO RELATED APPLICATIONS

This application claims priority under 35 U.S.C. § 119(b) to Japanese Application No. 2020-023720, filed on Feb. 14, 2020, the disclosure of which is incorporated herein by reference in its entirety.

BACKGROUND OF THE INVENTION

Field of the Invention

The present disclosure relates to a production method of a propylene polymer such as a heterophasic propylene polymer material.

SUMMARY OF THE INVENTION

Recently, further improvement in productivity has been required. However, because catalytic activity is high inside gas phase polymerization reactors, especially such gas phase polymerization reactors configured to perform the gas phase polymerization at first, there is a possibility that agglomerates would be generated, and therefore, it has been difficult to attain a high productivity while reducing the generation of agglomerates.

The present disclosure was made in view of the aforementioned requirement, and an object thereof is to provide a method capable of performing continuous production of a propylene polymer stably with a high productivity while reducing generation of agglomerates.

As a result of diligent studies, the present inventors found that when an average retention time, an average particle diameter of fed powder, and the like in a gas phase polymerization reactor, especially, in a gas phase polymerization reactor configured to perform gas phase polymerization at first, satisfy a predetermined condition, the propylene polymer can be manufactured with a high productivity while reduction effectively reducing generation of agglomerates, thereby accomplishing the present invention.

That is, the present invention is

[1]

A method of producing a propylene polymer, in which a monomer(s) comprising propylene is/are (co)polymerized in a presence of an olefin polymerization catalyst with two or more gas phase polymerization reactors, or three or more of the liquid phase polymerization reactor(s) and the gas phase polymerization reactor(s) in total, in which at least one gas phase polymerization reactor among the gas phase polymerization reactors or the gas phase polymerization reactor(s) is such that an operation performance evaluation index f defined by the following formula (A) is not less than 30 but not more than 1250:

[Math. 1]

$$f=(\exp(C_o))^a \cdot \tau_G^b \cdot D_{pi}^c \quad (A)$$

where $\tau_G$ is an average retention time [hour] in the gas phase polymerization in question, $D_{pi}$ is an average particle diameter [μm] of fed powder, and $C_o$ is a total amount [wt %] of an ethylene-derived structural unit and C4-C12 α-olefin-derived structural units in a polymer in discharged powder, where a=−0.50, b=2.50, and c=0.65.

Hereinafter, [2] to [9] are preferable aspects or embodiments of the present invention.

[2]

The method according to [1], in which the at least one gas phase polymerization reactor comprises a gas phase polymerization reactor (i) for first gas phase polymerization.

[3]

The method according to [2], comprising:

(1) (co)polymerizing the monomer(s) comprising propylene in the presence of the olefin polymerization catalyst with at least one gas phase polymerization reactor comprising the gas phase polymerization reactor (i) for the first gas phase polymerization, so as to produce a propylene homopolymer (I-1) and/or a propylene copolymer (I-2); and (2) copolymerizing propylene and at least one olefin selected from the group consisting of ethylene and C4 to C12 α-olefins, in the presence of the propylene homopolymer (I-1) and/or the propylene copolymer (I-2) obtained in (1) with at least one gas phase polymerization reactor, so as to produce a propylene copolymer (II), in which the propylene copolymer (I-2) is such a propylene copolymer that comprises a structural unit(s) derived from propylene and a structural unit derived from the at least one olefin selected from the group consisting of ethylene and C4 to C12 α-olefins, in such a way that content of the structural unit(s) derived from the at least one olefin selected from the group consisting of ethylene and C4 to C12 α-olefins is not less than 0.01 wt % but less than 15 wt % where a total amount of the propylene copolymer (I-2) is 100 wt %, the propylene copolymer (II) is such a propylene copolymer that comprises a structural unit(s) derived from propylene and a structural unit derived from the at least one olefin selected from the group consisting of ethylene and C4 to C12 α-olefins, in such a way that content of the structural unit(s) derived from the at least one olefin selected from the group consisting of ethylene and C4 to C12 α-olefins is not less than 15 wt % but not more than 80 wt % where a total amount of the propylene copolymer (II) is 100 wt %, and the propylene copolymer thus produced is such a heterophasic propylene polymer material that comprises the propylene homopolymer (I-1) and/or the propylene copolymer (I-2), and the propylene copolymer (II) in such a way that content of the propylene copolymer (II) is 15 wt % or more where a total amount of the heterophasic propylene polymer material is 100 wt %.

[4]

The method according to [2] or [3], comprising, before the (co)polymerization with the gas phase polymerization reactor (i) for the first gas phase polymerization:

(co)polymerizing the monomer comprising propylene with a liquid phase polymerization reactor, so as to obtain a (co)polymer, in the presence of which the (co)polymerization with the gas phase polymerization reactor (i) for the first gas phase polymerization is carried out.

[5]

The method according to any one of [1] to [4], in which the at least one gas phase polymerization reactor comprises a fluidized bed reactor, a spouted bed reactor, or a horizontal reactor internally provided with a stirring device for rotating about a horizontal axis.

[6]

The method according to any one of [3] to [5], in which content of the propylene copolymer (II) in the heterophasic propylene polymer is 20 wt % or more.

[7]
The method according to any one of [2] to [6], in which the propylene polymer is for use as a material for an automobile part, a container for food or medical use, a part of furniture or electric device, or a civil engineering or building material.

[8]
A propylene polymer produced by the method according any one of [1] to [7].

[9]
An automobile part, a container for food or medical uses, a component for home appliance or electrical device, or a civil engineering or building material, which comprise the propylene polymer according to [8].

According to a production method of the present disclosure, it is possible to produce a propylene polymer with a high productivity while reducing generation of agglomerates.

According to one aspect, by applying the production method of the present disclosure to a production method of a heterophasic propylene polymer material comprising a propylene homopolymer (which comprises a little amount of a copolymer of propylene and an olefin other than propylene) and a copolymer of propylene and an olefin such as ethylene other than propylene, it is possible to produce the heterophasic propylene polymer material with a high productivity while reducing the generation of agglomerates. The heterophasic propylene polymer material is, in general, manufactured in such a way that the propylene homopolymer (or a propylene copolymer with a low comonomer content) is prepared at a first-stage polymerization step and a copolymerization of propylene and the olefin such as ethylene is performed at a second-stage polymerization step. In a case of polymerizing a heterophasic propylene polymer material having a high ratio of the copolymer of propylene and the olefin such as ethylene polymerized at the second-stage polymerization step, it is necessary to have a high catalytic activity at the first-stage polymerization step in order to maintain sufficient catalytic activity until the second-stage polymerization step. Such a high catalytic activity at the first-stage polymerization step would possibly lead to the generation of agglomerates. Even in such a case, the application of the present disclosure would effectively reduce the generation of the agglomerates.

BRIEF DESCRIPTION OF THE DRAWINGS

FIG. 1 is a view illustrating a schematic configuration of a production method according to one embodiment of the present disclosure;

FIG. 2 is a cross-sectional view schematically illustrating magnification of a gas phase polymerization reactor (i) illustrated in FIG. 1;

FIG. 3 is a view illustrating schematic configuration of a production method according to one preferable embodiment of the present disclosure; and FIG. 4 is a view illustrating a schematic configuration of a production method according to another embodiment of the present disclosure.

DETAILED DESCRIPTION OF THE PREFERRED EMBODIMENTS

The present invention is a method of producing a propylene polymer, in which a monomer(s) comprising propylene is/are (co)polymerized in a presence of an olefin polymerization catalyst with a polymerization system comprising two or more gas phase polymerization reactors or a polymerization system comprising a liquid phase polymerization reactor(s) and a gas phase polymerization reactor(s) in such a way that a total number of the liquid phase polymerization reactor(s) and the gas phase polymerization reactor(s) is three or more, in which at least one gas phase polymerization reactor among the gas phase polymerization reactors or the gas phase polymerization reactor(s) is such that an operation performance evaluation index f defined by the following formula (A) is not less than 30 but not more than 1250:

[Math. 2]

$$f=(\exp(C_o))^a \cdot \tau_G^b \cdot D_{pi}^c \qquad (A)$$

where $\tau_G$ is an average retention time [hour] in the gas phase polymerization in question, $D_{pi}$ is an average particle diameter [μm] of fed powder, and $C_o$ is a total amount [wt %] of an ethylene-derived structural unit and C4-C12 α-olefin-derived structural units in a polymer in discharged powder, where a=−0.50, b=2.50, and c=0.65.

In the present disclosure, it is required that at least one gas phase polymerization reactor have an operation performance evaluation index f of not less than 30 but not more than 1250, where the operation performance evaluation index f is defined according to the formula (A). Thus, in case where a plurality of gas phase polymerization reactors is used, it may be configured such that only one of the plurality of gas phase polymerization reactors has an operation performance evaluation index f of not less than 30 but not more than 1250, or it may be configured such that plural ones of, for example, all of the plurality of gas phase polymerization reactors have an operation performance evaluation index f of not less than 30 but not more than 1250.

In general, the catalytic activity is higher in a gas phase polymerization reactor for first gas phase polymerization. Thus, for the sake of effectively reducing the generation of agglomerates, it is preferable that the gas phase polymerization reactor for first gas phase polymerization (hereinafter, which may be referred to as a gas phase polymerization reactor (i) for the first gas phase polymerization) have an operation performance evaluation index f of not less than 30 but not more than 1250.

In case where only one gas phase polymerization reactor is provided, the gas phase polymerization reactor is the gas phase polymerization reactor (i) for the first gas phase polymerization. Thus, it is preferable that this gas phase polymerization reactor meet the afore-mentioned condition, that is, this gas phase polymerization reactor be operated under a condition in which the operation performance evaluation index f is not less than 30 but not more than 1250. In this configuration, a space time yield would be possibly high in some cases, and the space time yield may be, for example, 0.5 (kg/kg-bed·hour) or more.

In case where two or more gas phase polymerization reactors are provided, it is preferable that a gas phase polymerization reactor that is the most upstream one of the gas phase polymerization reactors and is for the first gas phase polymerization be a gas phase polymerization reactor (i) that meets the afore-mentioned condition, that is, be operated under a condition in which the operation performance evaluation index f is not less than 30 but not more than 1250. In this case, the rest of the gas phase polymerization reactors may or may not be operated under such a condition.

In the present invention, the propylene polymer is produced by (co)polymerizing a monomer(s) comprising propylene. The propylene polymer may be any one of a propylene homopolymer, a propylene copolymer, or a heterophasic propylene polymer material, or any combination thereof.

One preferable embodiment of the present invention is a method of producing the heterophasic propylene polymer material by performing steps of:

(1) (co)polymerizing the monomer(s) comprising propylene in the presence of the olefin polymerization catalyst with at least one gas phase polymerization reactor comprising the gas phase polymerization reactor (i) for the first gas phase polymerization, so as to produce a propylene homopolymer (I-1) and/or a propylene copolymer (I-2); and (2) copolymerizing propylene and at least one olefin selected from the group consisting of ethylene and C4 to C12 α-olefins, in the presence of the propylene homopolymer (I-1) and/or the propylene copolymer (I-2) obtained in (1) with at least one gas phase polymerization reactor, so as to produce a propylene copolymer (II).

In this embodiment, the propylene copolymer (I-2) is such a propylene copolymer that comprises a structural unit(s) derived from propylene and a structural unit derived from the at least one olefin selected from the group consisting of ethylene and C4 to C12 α-olefins, in such a way that content of the structural unit(s) derived from the at least one olefin selected from the group consisting of ethylene and C4 to C12 α-olefins is not less than 0.01 wt % but less than 15 wt % where a total amount of the propylene copolymer (I-2) is 100 wt %, and the propylene copolymer (II) is such a propylene copolymer that comprises a structural unit(s) derived from propylene and a structural unit derived from the at least one olefin selected from the group consisting of ethylene and C4 to C12 α-olefins, in such a way that content of the structural unit(s) derived from the at least one olefin selected from the group consisting of ethylene and C4 to C12 α-olefins is not less than 15 wt % but not more than 80 wt % where a total amount of the propylene copolymer (II) is 100 wt %.

Further, the heterophasic propylene polymer material thus produced in this embodiment is such a heterophasic propylene polymer material that comprises the propylene homopolymer (I-1) and/or the propylene copolymer (I-2), and the propylene copolymer (II) in such a way that content of the propylene copolymer (II) is 15 wt % or more where a total amount of the heterophasic propylene polymer material is 100 wt %.

That is, the preferable embodiment is a production method of a heterophasic propylene polymer material comprising a propylene homopolymer (I-1) and/or a propylene copolymer (I-2), and a propylene copolymer (II) in such way that content of the propylene copolymer (II) is 15 wt % or more (where a total amount of the heterophasic propylene polymer material is 100 wt %), the production method comprising:

(1) (co)polymerizing a monomer(s) comprising propylene in the presence of an olefin polymerization catalyst by using one or more gas phase polymerization reactors, in order to produce the propylene homopolymer (I-1) and/or the propylene copolymer (I-2); and (2) copolymerizing propylene and at least one olefin selected from the group consisting of ethylene and C4 to C12 α-olefins, by using one or more gas phase polymerization reactors, in presence of the propylene homopolymer (I-1) and/or propylene copolymer (I-2) thus obtained in (1), in order to produce the propylene copolymer (II), wherein the gas phase polymerization reactor (i) for performing the first gas phase polymerization at (1) has an operation performance evaluation index f of not less than 30 but not more than 1250, where the operation performance evaluation index f is defined by the following formula (A):

[Math. 3]

$$f=(\exp(C_o))^a \le \tau_G^b \cdot D_{pi}^c \quad (A)$$

where a=−0.50, b=2.50, and c=0.65.

Here, $\tau_G$ [hour] is an average retention time in the gas phase polymerization reactor in question, $D_{pi}$ [μm] is an average particle diameter of fed powder, and $C_o$ [wt %] is a total amount of ethylene-derived structural unit and C4-C12 α-olefin-derived structural units in a polymer of discharged powder. Details of these parameters will be described later.

In the present disclosure, what is meant by the propylene polymer is a polymer having a monomer unit derived from propylene. Examples of the propylene polymer include the propylene homopolymer, the propylene copolymers, and the heterophasic propylene polymer material.

The propylene copolymer comprises a monomer unit derived from propylene and a monomer unit derived from a monomer (comonomer) other than propylene. It is preferable that the propylene copolymer comprise the monomer unit derived from the monomer other than propylene by an amount not less than 0.01 wt % but not less than 20 wt % on a basis of a weight of the propylene copolymer.

Examples of the monomer other than propylene include ethylene and a C4 to C12 α-olefin. Among them, the monomer other than propylene may be preferably at least one selected from the group consisting of ethylene and C4 to C10 α-olefins, more preferably at least one selected from the group consisting of ethylene, 1-butene, 1-hexene, and 1-octene, or further preferably at least one selected from the group consisting of ethylene and 1-butene.

Examples of the propylene copolymer include propylene random copolymer. Examples of the propylene random copolymer include a propylene-ethylene random copolymer, propylene-1-butene random copolymer, propylene-1-hexene random copolymer, propylene-1-octene random copolymer, propylene-ethylene-1-butene random copolymer, propylene-ethylene-1-hexene random copolymer, propylene-ethylene-1-octene random copolymer, and the like.

According to one preferable embodiment of the present disclosure, it may be possible to produce a heterophasic propylene polymer material having a particular configuration. The configuration of the heterophasic propylene polymer material will be described in detail below.

The heterophasic propylene polymer material according to the preferable embodiment is (i) a heterophasic propylene polymer material comprising the propylene homopolymer (I-1) and the propylene copolymer (II), or (ii) a heterophasic propylene polymer material comprising the propylene copolymer (I-2) and the propylene copolymer (II), and is configured such that the content of the propylene copolymer (II) is 15 wt % or more (where the total amount of the heterophasic propylene polymer material is 100 wt %).

[Propylene Homopolymer (I-1)]

In the present embodiment, the propylene homopolymer (I-1) is a homopolymer comprising a monomer unit derived from propylene.

[Propylene Copolymer (I-2)]

In this embodiment, the propylene copolymer (I-2) is such a propylene copolymer that comprises a monomer unit (s) derived from propylene and a monomer unit derived from the at least one olefin selected from the group consisting of ethylene and C4 to C12 α-olefins, in such a way that content of the monomer unit(s) derived from the at least one olefin selected from the group consisting of ethylene and C4 to C12 α-olefins is not less than 0.01 wt % but less than 15 wt % where a total amount of the propylene copolymer (I-2) is 100 wt %.

In the present embodiment, the propylene homopolymer (I-1) is a homopolymer comprising a monomer unit substantially derived from propylene.

The propylene copolymer (I-2) is such a propylene copolymer that comprises a monomer unit(s) derived from propylene and a monomer unit derived from the at least one olefin selected from the group consisting of ethylene and C4 to C12 α-olefins, in such a way that content of the monomer unit(s) derived from the at least one olefin selected from the group consisting of ethylene and C4 to C12 α-olefins is not less than 0.01 wt % but less than 15 wt % where a total amount of the propylene copolymer (I-2) is 100 wt %, and the propylene copolymer (II) is such a propylene copolymer that comprises a monomer unit(s) derived from propylene and a monomer unit derived from the at least one olefin selected from the group consisting of ethylene and C4 to C12 α-olefins, in such a way that content of the monomer unit(s) derived from the at least one olefin selected from the group consisting of ethylene and C4 to C12 α-olefins is not less than 15 wt % but not more than 80 wt % where a total amount of the propylene copolymer (II) is 100 wt %.

Examples of C4 to C12 α-olefins from which the C4 to C12 α-olefin-derived monomer unit of the propylene copolymer (I-2) is derivable include 1-butene, 1-pentene, 1-hexene, 1-heptene, 1-octene, 1-nonene, 1-decene, 3-methyle-1-butene, 3-methyl-1-pentene, 4-methyl-1-penetene, 2-ethyle-1-hexene, 2,2,4-trimethyl-1-pentene, and the like, among which 1-butene, 1-hexene, and 1-octene are preferable and 1-butene is more preferable.

For the propylene copolymer (I-2), the monomer unit(s) derived from at least one olefin selected from the group consisting of ethylene and C4 to C12 α-olefins may be one kind of such a monomer unit or a combination of two or more kinds of such monomer units.

Specific examples of the propylene copolymer (I-2) include propylene-ethylene copolymer, propylene-1-butene copolymer, propylene-1-hexene copolymer, propylene-1-octene copolymer, propylene-1-decene copolymer, propylene-ethylene-1-butene copolymer, propylene-ethylene-1-hexene copolymer, propylene-ethylene-1-octene copolymer, propylene-ethylene-1-decene copolymer, and the like, among which propylene-ethylene copolymer, propylene-1-butene copolymer, and propylene-ethylene-1-butene copolymer are preferable.

In the present embodiment, the propylene copolymer (I-2) may be a random copolymer, and specific examples thereof include propylene-ethylene random copolymer, propylene-α-olefin random copolymer, propylene-ethylene-α-olefin copolymer, and the like.

[Propylene Copolymer (II)]

In the present embodiment, the propylene copolymer (II) is such a propylene copolymer that comprises a monomer unit(s) derived from propylene and a monomer unit derived from the at least one olefin selected from the group consisting of ethylene and C4 to C12 α-olefins, in such a way that content of the monomer unit(s) derived from the at least one olefin selected from the group consisting of ethylene and C4 to C12 α-olefins is not less than 15 wt % but not more than 80 wt % in total where a total amount of the propylene copolymer (II) is 100 wt %.

Specific examples of C4 to C12 α-olefins from which the C4 to C12 α-olefins-derived monomer units of the propylene copolymer (II) are derivable include the specific examples of C4 to C12 α-olefins from which the C4 to C12 α-olefin-derived monomer units of the propylene copolymer (I-2) listed above. For the propylene copolymer (II), the monomer unit(s) derived from at least one olefin selected from the group consisting of ethylene and C4 to C12 α-olefins may be one kind of such a monomer unit or a combination of two or more kinds of such monomer units, as for the propylene copolymer (I-2).

Examples of the propylene copolymer (II) include propylene-ethylene copolymer, propylene-1-butene copolymer, propylene-1-hexene copolymer, propylene-1-octene copolymer, propylene-1-decene copolymer, propylene-ethylene-1-butene copolymer, propylene-ethylene-1-hexene copolymer, propylene-ethylene-1-octene copolymer, propylene-ethylene-1-decene copolymer, and the like, among which propylene-ethylene copolymer, propylene-1-butene copolymer, and propylene-ethylene-1-butene copolymer are preferable.

In the present embodiment, the content of the propylene copolymer (II) is 15 wt % or more in the heterophasic propylene polymer material, and for the sake of impact tolerance of a product molded therefrom, the content of the propylene copolymer (II) is preferably 20 wt % or more, more preferably 30 wt % or more, further preferably 40 wt % or more, and further more preferably 50 wt % or more (where the total amount of the heterophasic propylene polymer material is 100 wt %).

The heterophasic propylene polymer material produced according to the present embodiment is such that a limiting viscosity [η] II of the propylene copolymer (II) is preferably in a range of 0.1 to 20 dL/g, more preferably in a range of 1 to 15 dL/g, and further preferably in a range of 1.5 to 10 dL/g.

[Heterophasic Propylene Polymer Material]

The heterophasic propylene polymer material obtainable by the production method according to the present embodiment is, in general, in a form of fine particles and a median particle diameter thereof is preferably of 1000 μm or greater, more preferably 1300 μm or greater, or further preferably of 1900 μm or greater, while the median particle diameter of the heterophasic propylene polymer material is preferably 5000 μm or smaller, or more preferably of 4000 μm or smaller. It is preferable that the median particle diameter be within these ranges for the sake of better powder characteristics, smaller load on a compressor for compressing recycling gas for the gas phase polymerization reactor(s), and the like reasons.

The median particle diameter of the heterophasic propylene polymer material can be measured by methods known in the art to which the present disclosure pertains, and for example can be measured as a volume-based median particle diameter obtained by a laser diffraction particle diameter distribution measuring device.

A still bulk density of the heterophasic propylene polymer material obtainable by the production method of the present embodiment is preferably in a range of 0.400 to 0.500 g/mL, more preferably in a range of 0.420 to 0.500 g/mL, or further preferably in a range of 0.450 to 0.500 g/mL.

Next, the production method of the heterophasic propylene polymer material according to one embodiment of the present disclosure will be more specifically described below.

The production method of the heterophasic propylene polymer material according to the present embodiment comprises:

(1) (co)polymerizing the monomer(s) comprising propylene in the presence of the olefin polymerization catalyst with at least one gas phase polymerization reactor, so as to produce a propylene homopolymer (I-1) and/or a propylene copolymer (I-2); and (2) copolymerizing propylene and at least one olefin selected from the group consisting of ethylene and C4 to C12 α-olefins, in the presence of the propylene homopolymer (I-1) and/or the propylene copolymer (I-2) obtained in the step (1) with at least one gas phase polymerization reactor, so as to produce a propylene copolymer (II)

FIG. 1 illustrates a schematic configuration of especially preferable one among the production method of the heterophasic propylene polymer material according to the present embodiments.

In FIG. 1, the reference numeral 11 indicates a gas phase polymerization reactor for gas phase polymerization at the step (1). In the embodiment illustrated in FIG. 1, the gas phase polymerization reactor 11 is only one gas phase polymerization reactor for the step (1) and therefore is the gas phase polymerization reactor (i) for the first gas phase polymerization in the step (1).

In this embodiment, monomer(s) 16 comprising propylene is/are circulated in piping comprising the gas phase polymerization reactor 11, in such a way that the monomer(s) 16 comprising propylene is/are supplied to the gas phase polymerization reactor 11 from a bottom part thereof and discharged from the gas phase polymerization reactor 11 from a top part thereof.

The gas phase polymerization reactor 11 is supplied with fed powder 13, which comprises an olefin polymerization catalyst and may be preferably pre-polymerized.

In this embodiment, the gas phase polymerization reactor 11 is provided with a diffusion plate and stirring vanes for performing the gas phase polymerization in a fluidized bed. Although the gas phase polymerization reactor 11 is one provided with such stirring vanes in FIG. 1, the gas phase polymerization reactor 11 may be one without such stirring vanes. In a fluidized bed formed above the diffusion plate, the monomer(s) 16 comprising propylene is/are (co)polymerized in the presence of the olefin polymerization catalyst contained in the fed powder 13, thereby forming the propylene homopolymer (I-1) and/or the propylene copolymer (I-2). When powder grown with the propylene homopolymer (I-1) and/or the propylene copolymer (I-2) thus formed, and derived from the fed powder 13, is grown to powder with a predetermined particle diameter or the like, the powder is then supplied to the step (2) as discharged powder comprising the propylene homopolymer (I-1) and/or the propylene copolymer (I-2) 14.

In the step (1), the operation condition of the gas phase polymerization reactor 11 operated as the gas phase polymerization reactor (i) for the first gas phase polymerization meets the predetermined condition set forth in the present disclosure, and more specifically, meets such condition that the operation performance evaluation index f is not less than 30 but not more than 1250.

In FIG. 1, the reference numeral 12 indicates a gas phase polymerization reactor for performing the gas phase polymerization at the step (2). In this embodiment, the gas phase polymerization reactor 12 is configured like the gas phase polymerization reactor 11 for performing the step (1), such that piping for circulating the monomers is provided and monomers 17 are supplied from a bottom part of the gas phase polymerization reactor 12 and discharged from a top part of the gas phase polymerization reactor 12. However, the monomers 17 comprise propylene and at least one olefin selected from the group consisting of ethylene and C4 to C12 α-olefins, for copolymerizing the propylene copolymer (II).

Like the gas phase polymerization reactor 11, the gas phase polymerization reactor 12 is provided with a diffusion plate and stirring vanes for performing the gas phase polymerization in a fluidized bed. Although the gas phase polymerization reactor 12 is provided with such stirring vanes in FIG. 1, the gas phase polymerization reactor 12 may be one without such stirring vanes. In the fluidized bed formed above the diffusion plate, the monomers 17 comprising propylene and the at least one olefin selected from the group consisting of ethylene and C4 to C12 α-olefins are copolymerized in the presence of the olefin polymerization catalyst contained in the discharged powder comprising the propylene homopolymer (I-1) and/or the propylene copolymer (I-2) 14, thereby to form the propylene copolymer (II).

The discharged powder comprising the propylene homopolymer (I-1) and/or the propylene copolymer (I-2) 14 is grown with the propylene copolymer (II) thus formed, thereby to form powder derived therefrom, which is particles of the heterophasic propylene polymer material 15 comprising the propylene homopolymer (I-1) and/or the propylene copolymer (I-2) and the propylene copolymer (II). The powder derived from the discharge powder is discharged from the gas phase polymerization reactor 12 after the powder is grown to a predetermined particle diameter or the like.

The production method according to the present embodiment is only required to comprise the steps (1) and (2) and may or may not further comprise a step other than the steps (1) and (2).

In case where the production method further comprises a step other than the steps (1) and (2), the step other than the steps (1) and (2) may be carried out before the step (1), between the step (1) and the step (2), or after the step (2).

It is preferable that the step (2) be carried out right or shortly after the step (1), for the sake of maintaining and effectively utilizing the olefin polymerization catalyst contained in the propylene homopolymer (I-1) and/or the propylene copolymer (I-2) obtained in the step (1).

Before the step (1), the production method may comprise a step of preparing the olefin polymerization catalyst, a so-called prepolymerization step of polymerizing a small amount of propylene (with or without another monomer) in the presence of the olefin polymerization catalyst in order to obtain a prepolymerization catalyst component, a so-called olefin pre-preparation polymerization step of polymerizing propylene (with or without another monomer) in the presence of the olefin polymerization catalyst in order to prepare polyolefin particles having the catalytic activity, and/or the like step. The embodiment illustrated in FIG. 3 is an example in which a liquid phase polymerization reactor of a loop type is provided in order to carry out the olefin pre-preparation polymerization step before the step (1).

The prepolymerization step is not limited in terms of conditions and methods thereof, but for example, it is preferable to prepare the prepolymerization catalyst component by polymerizing propylene in the presence of the olefin polymerization catalyst (which may be preferably solid) in the presence of an organic aluminum compound, an electron-doner compound, or the like in an organic solvent such as n-hexane. In this case, it is preferable that the prepolymerization catalyst component be obtained as a slurry.

The olefin pre-preparation polymerization is also not limited in terms of conditions and method thereof, but it is preferable that the olefin pre-preparation polymerization be liquid phase polymerization, and for example, it is preferable to perform the olefin pre-preparation polymerization by polymerizing propylene (and an olefin other than propylene if necessary) in the presence of the olefin polymerization catalyst, which may be preferably the prepolymerization catalyst component obtained by the prepolymerization step, in the presence of an organic aluminum compound, an electron-doner compound, or the like in a liquid phase of propylene.

By preparing the polyolefin particles with a desired particle diameter and desired characteristics such as the catalytic activity by the olefin pre-preparation polymerization step, it becomes possible to uniformly and effectively carry out the following gas phase polymerization steps such as the step (1).

In case where the olefin pre-preparation polymerization is carried out in such a liquid phase, an average polymerization rate of the olefin pre-preparation polymerization step as defined below is preferably not less than 3000 g/(g·hour) but not more than 10000 g/(g·hour), or more preferably not less than 5000 g/(g·hour) but not more than 10000 g/(g·hour):

Average polymerization rate of the olefin pre-preparation polymerization step=weight of propylene polymer produced by the olefin pre-preparation polymerization per 1 g of solid catalyst component/average retention time of the whole olefin pre-preparation polymerization

[Step (1)]

The step (1) constituting the production method of the heterophasic propylene polymer material according to the present embodiment is a step of (co)polymerizing the monomer(s) comprising propylene in the presence of the olefin polymerization catalyst by using one or more gas phase polymerization reactors in order to produce the propylene homopolymer (I-1) and/or the propylene copolymer (I-2).

The step (1) is configured to use one or more gas phase polymerization reactors, that is, may be carried out with only one gas phase polymerization reactor or may be carried out with two or more gas phase polymerization reactors.

For the sake of simplification of the step (1), it is preferable that the step (1) use only one gas phase polymerization reactor.

For the sake of providing most suitable polymerization conditions according to proceedings of the polymerization, especially growth of the polymer particles, it is preferable that the step (1) use two or more gas phase polymerization reactors. In this case, it is preferable that the step (1) use three to ten gas phase polymerization reactors, and it is more preferable that the step (1) use six to ten gas phase polymerization reactors.

The gas phase polymerization reactor(s) used in the step (1) may be any kinds of gas phase polymerization reactor(s), but may be preferably a fluidized bed reactor, a spouted bed reactor, or a horizontal reactor internally provided with a stirring device for rotating about a horizontal axis. Note that, the fluidized bed reactor, the spouted bed reactor, or the horizontal reactor internally provided with a stirring device for rotating about a horizontal axis are not only usable as the gas phase polymerization reactor used in the step (1) in the present embodiment but also preferably usable as the gas phase polymerization reactors generally in the present disclosure, and especially preferably usable as the at least one gas phase polymerization reactor operated under the condition in which the operation performance evaluation index f is not less than 30 but not more than 1250.

The fluidized bed reactor is advantageous, for example, in that the fluidized bed reactor can provide a large contact area between gas such as the monomer and solid such as the polymer particles, and therefore can provide a high reaction rate and a high cooling rate, thereby making it possible to carry out the polymerization with a high productivity.

The spouted bed reactor is advantageous, for example, in that large particles or particles with complicate shapes can be fluidized with a relatively simple device and a relatively small amount of gas and a retention time distribution is small, thereby making it easy to obtain polymer/particles with a relatively high uniformity.

The horizontal reactor internally provided with a stirring device for rotating about a horizontal axis may be, for example, one described in the pamphlet of WO 2011/055802 A1 and is advantageous, for example, in that the polypropylene particles gradually growing are carried along an axial direction of the reactor due to two forces, namely, the generation of the polypropylene and mechanical stirring, and therefore can also provide a smaller retention time distribution, thereby making it easy to obtain the polymer/particles with a relatively high uniformity.

In case where the step (1) is provided with two or more gas phase polymerization reactors, the two or more gas phase polymerization reactors may comprise only one kind of the preferable reactors, or may comprise a combination of two or more kinds of the preferable reactors.

For example, a spouted bed reactor may be provided in a downstream of a fluidized bed reactor, or a fluidized bed reactor may be provided in a downstream of a spouted bed reactor.

A plurality of spouted bed reactors may be provided in a downstream of a fluidized bed reactor, and a fluidized bed reactor may be further provided in a downstream of the plurality of spouted bed reactors. For example, the embodiment illustrated in FIG. 3 is configured such that the step (1) is provided with seven gap phase polymerization reactors, and in a downstream of a fluidized bed gas phase reactor 311 acting as the gas phase polymerization reactor (i) for the first gas phase polymerization, spouted bed gas phase polymerization reactors 312 to 316 are provided in tandem, and a fluidized bed gas phase reactor 317 is further provided in a downstream of the spouted bed gas phase polymerization reactors 312 to 316.

Such a configuration is preferable because the polypropylene particles can be obtained with high uniformity.

Furthermore, as in an embodiment illustrated in FIG. 4, the gas phase polymerization reactor 41 at the step (1) may be provided with a plurality of horizontal reactors internally provided with a stirring device for rotating about a horizontal axis and connected with each other in tandem.

Gas Phase Polymerization Reactor (i)

Polymerization reaction at the gas phase polymerization reactor (i) for the first gas phase polymerization among the gas phase polymerization reactors used in the step (1) meets a condition described below.

As described above, the step (1) may be carried out with only one gas phase polymerization reactor or with two or more gas phase polymerization reactors. In case where the step (1) is carried out with only one gas phase polymerization reactor, the only one gas phase polymerization reactor is the gas phase polymerization reactor (i) for the first gas phase polymerization. In case where the step (1) is carried out with two or more gas phase polymerization reactors, one which carries out the phase polymerization first among the two or more gas phase polymerization reactors operates as the gas phase polymerization reactor (i).

The gas phase polymerization reactor (i) may be any kind of gas phase polymerization reactor, but can be preferably any of the fluidized bed reactor, a spouted bed reactor, or a horizontal reactor internally provided with a stirring device for rotating about a horizontal axis with those advantages mentioned above. It is especially preferable that the gas phase polymerization reactor (i) is a fluidized bed reactor.

In the production method of the heterophasic propylene polymer material according to the present embodiment, the steps (1) and (2) perform the gas phase polymerization of the monomers comprising propylene, and therefore the gas phase polymerization reactor (i) for the first gas phase polymerization is supplied with the catalyst having high activity in order that sufficient catalytic activity at the step (2) may be ensured as well. Especially in case where it is required to increase a ratio of the propylene copolymer (II) produced in the step (2), it is preferable that the space time yield of the gas phase polymerization reactor (i) for the first gas phase polymerization be 0.2 kg/(kg·hour) or more. Such a high catalytic activity would possibly lead to gelation of the polymer in the gas phase polymerization reactor (i), which would result in the generation of agglomerates, and therefore how to reduce such generation of agglomerates has been an issue.

According to the present embodiment, when the polymerization condition of the gas phase polymerization reactor (i) is such that the operation performance evaluation index f obtained by formula (A) described later is 30 or more, or preferably more than 30, the generation of agglomerates at the gas phase polymerization reactor (i) can be effectively reduced even when the catalytic activity is so high as to attain a space time yield of 0.2 kg/(kg·hour) or more.

Furthermore, according to the present embodiment, when the operation performance evaluation index f is 1250 or less, the (co)polymer to be produced by the gas phase polymerization reactor (i) can be produced in a relatively short time. Thus, by meeting these conditions at the same time, the heterophasic propylene polymer material can be continuously produced stably with a high productivity while reducing the generation of agglomerates.

It should be noted that a preferable operation performance evaluation index f, a preferable operation condition, preferable amounts, and the like described in detail below are not only employable in the gas phase polymerization reactor (i) according to the present embodiment but also preferably employable in gas phase polymerization reactors usable in the present disclosure in general, and especially preferably employable in at least one gas phase polymerization reactor operated under the condition in which the operation performance evaluation index f is not less than 30 but not more than 1250.

Space Time Yield

Here, the space time yield (kg/(kg·bed·hour)) is a ratio of a production amount of the polymer produced per unit time (kg/hour) with respect to an amount of polymer powder stationarily present inside the gas phase polymerization reactor (i) during the polymerization process (holdup amount (kg-bed)), and is defined by the following formula and measurable by, for example, a method described in Examples of the present disclosure.

Space Time Yield ((kg/(kg-bed·hour))=Production Amount (kg/hour)/Holdup Amount HU (kg-bed)

It is only required that the space time yield be 0.20 (kg/(kg-bed·hour)), but for the sake of the overall productivity, further improvement of the catalytic activity at the step (2), reactor's miniaturization, and the like reasons, it is preferable that the space time yield be 0.55 (kg/(kg-bed·hour)) or more and it is more preferable that the space time yield be 0.9 (kg/(kg-bed·hour)) or more.

On the other hand, for the sake of further effectively reducing the generation of agglomerates, and the like reasons, it is preferable that the space time yield be 2.5 (kg/(kg-bed·hour)) or less and it is more preferable that the space time yield be 1.7 (kg/(kg-bed·hour)) or less.

The space time yield can be adjusted by changing the polymerization condition as appropriately, and more specifically, a higher space time yield can be obtained by increasing an amount of the catalyst supplied, or by using a catalyst with a higher activity.

Holdup Amount HU

The holdup amount HU (kg-bed) is an amount of the polymer powder stationarily present inside the gas phase polymerization reactor (i) during the polymerization process.

A method of measuring the holdup amount HU in case where the gas phase polymerization reactor (i) is a fluidized bed polymerization reactor will be described below, referring to the embodiment illustrated in FIG. 2 as an example.

The reference numeral 21 in FIG. 2 indicates one example of the gas phase polymerization reactor (i), and FIG. 2 is a cross-sectional view schematically illustrating the gas phase polymerization reactor 11 according to the embodiment illustrated in FIG. 1. Inside the fluidized bed gas phase polymerization reactor 21, a fluidized bed 29 is formed. P2 is pressure at bottom of the fluidized bed and P1 is pressure at top of the fluidized bed. A difference between the pressures (differential pressure) P2–P1 is defined as pressure loss $\Delta p_f$ [Pa] of the fluidized bed. From the pressure loss $\Delta p_f$ [Pa], the holdup HU (kg-bed) can be calculated out according to the following formula (B).

[Math. 4]

$$\Delta p_f = \frac{HU \cdot g}{A} \quad -(B)$$

where $A(m^2)$ is a cross-sectional area of the gas phase polymerization reactor at a height at which the fluidized bed is present, and g $(m/s^2)$ is gravitational acceleration.

In case where the gas phase polymerization reactor (i) is a spouted bed reactor, the holdup amount HU can be calculated out according to the formula (B) from the pressure loss $\Delta p_f$ [Pa] of the bed, the cross-sectional area A $(m^2)$ of the gas phase polymerization reactor, and the gravitational acceleration $g(m/s^2)$. Here, the cross-sectional area A of the gas phase polymerization reactor is a cross-sectional area of where the powder bed is present.

In case where the gas phase polymerization reactor (i) is a horizontal reactor internally provided with a stirring device for rotating about a horizontal axis, it is not possible to calculate out the holdup amount HU from the pressure loss (differential pressure). Thus, the holdup amount HU is calculated out according the following formula from a level V $(m^3)$ that is a volume of the powder bed worked out from a height from the lower surface of the reactor to the top surface of the powder bed measurable by using a level gauge (γ-ray level gauge, admittance level gauge (level switch), electrostatic capacitance level gauge, and the like), and still bulk density (SBD)(kg/m³) of the powder.

Holdup Amount HU (kg)=Level $V$ (m³)×SBD (kg/m³)

A preferable holdup amount HU is such that the holdup amount provides a space time yield of 0.55 (kg/(kg-bed·hour)) or more. Moreover, how much holdup amount is suitable is dependent on a scale of the gas phase polymerization reactor (whether the gas phase polymerization reactor is for pilot scale or commercial scale, or the like). Thus, it is difficult to specify the suitable numerical values of the holdup amount HU. However, for example, in case where the gas phase polymerization reactor (i) is a fluidized bed reactor or the spouted bed reactor, the suitable holdup amount HU can be indirectly specified from a ratio L/D, which is dependent on the holdup amount HU, where L is a height L (m) from the diffusion plate to the surface of powder bed and D is a diameter D (m) of the reactor.

Here, the powder bed surface height L (m) can be calculated according to the following formula from the holdup amount HU (kg), a fluidized bulk density FBD (kg/m³) of the powder, and the cross-sectional area A (m²) of the gas phase polymerization reactor.

Powder Bed Surface Height $L$ (m)=Holdup Amount HU (kg)/Fluidized Bulk Density FBD (kg/m³) of the Powder/Cross-Sectional Area $A$ (m²) of the Gas Phase Polymerization Reactor For the sake of preventing insufficient fluidability such as slagging, it is preferable that L/D be 10 or less, and it is more preferable that L/D be 5 or less. On t other hand, for the sake of reducing scattering of small-diameter powder, it is preferable that L/D be 0.1 or more and it is more preferable that L/D be 0.3 or more.

In case where the gas phase polymerization reactor (i) is a horizontal reactor internally provided with a stirring device for rotating about a horizontal axis, it is preferable that the holdup amount HU be such that the holdup amount HU results in a level V (m³) of the powder in a range of 40 to 80 vol % (for example, see the publication of Japanese Patent No. 4391018, or the like).

The holdup amount HU can be adjusted to be appropriate for a design, operation condition, and the like of the gas phase polymerization reactor (i).

Production Amount

The production amount (kg/hour) in the gas phase polymerization reactor (i) may be measured by measuring an amount of the polymer discharged from the gas phase polymerization reactor (i) per unit time, or may be calculated out from a reaction heat generated in the gas phase polymerization reactor (i) measured by measuring temperature increase or the like, and from a monomer reaction heat. More specifically, the production amount can be worked out by a method described in Examples of the present disclosure.

As a matter of course, a larger production amount is preferable and there is no particular optimum value for the production amount. However, in view of restrictions of the device(s) and cost, the production amount is generally in a range of 1 to 100 kg/hour per of an internal capacity of the gas phase polymerization reactor.

Moreover, the space time yield is used as an index on productivity not dependent on the production scale, and a person skilled in the art can grasp the productivity of the gas phase polymerization reactor (i) on the basis of the space time yield. The preferable value and the adjustment method of the space time yield have been described above.

Operation Performance Evaluation Index f

The operation performance evaluation index f is a value calculated according to the following formula (A) on the basis of an average retention time $\tau_G$ [hour], an average particle diameter $D_{pi}$ [μm] of fed powder, and a total amount $C_o$ [wt %] of comonomer-derived structural units in a polymer of discharged powder, which are polymerization conditions in the gas phase polymerization reactor (i).

[Math. 5]

$$f=(\exp(C_o))^a \tau_G^b \cdot D_{pi}^c \qquad (A)$$

where a=−0.50, b=2.50, and c=0.65.

The operation performance evaluation index f is 30 or more but may be preferably 35 or more for the sake of effectively reducing the generation of agglomerates at a higher space time yield, or the like reason.

For the sake of preventing or alleviating a decrease of the space time yield in the gas phase polymerization reactor (i) or the like reason, the operation performance evaluation index f may be preferably 1250 or less, or especially preferably 1000 or less.

The operation performance evaluation index f can be adjusted by appropriately changing the polymerization conditions of the gas phase polymerization reactor (i), or more specifically, by appropriately changing the elements of the formula (A). For example, by prolonging the average retention time $\tau_G$ [hour] or enlarging the average particle diameter $D_{pi}$ [μm] of the fed powder, it is possible to realize a greater operation performance evaluation index f.

Average Retention Time $\tau_G$ t[hour]

The average retention time $\tau_G$ in the gas phase polymerization reactor (i) is a time period for which the polymer comprising the catalyst component is retained inside the reactor.

The retention time has some distribution because how long the powder is retained would be slightly different for different portions of the powder, but average retention time $\tau_G$ can be calculated out according to the following formula.

Average retention time $\tau_G$ [hour]=HU [kg]/Total Production Amount [kg/hour]

where the total production amount herein is a total amount of powder polymerized by a reactor in question and all preceding reactors comprising the gas phase polymerization reactor (i).

The average retention time $\tau_G$ is so set that the operation performance evaluation index f as defined by the formula (A) will be within the predetermined range. However, because a shorter retention time provides a higher space time yield, the average retention time $\tau_G$ may be preferably 10 hours or shorter, more preferably two hours or shorter, further preferably 1.5 hours or shorter, or most preferably 1.0 hours or shorter, for the sake of a better space time yield.

Average particle diameter $D_{pi}$ [μm] of the fed powder

The average particle diameter $D_{pi}$ [μm] of the fed powder is an average particle diameter (median diameter ($D_{50}$) based on volume) of particles such as catalyst particles and pre-polymerized polyolefin particles to be supplied to the gas phase polymerization reactor (i).

For example, the gas phase polymerization reactor (i) for the first gas phase polymerization is a fluidized bed reactor 21 as illustrated in FIG. 2, the fed powder is supplied to a fluidized bed 29 from where indicated by the reference numeral 23.

The average particle diameter $D_{pi}$ of the fed powder may be measured by a conventional known method such as a laser diffraction method, and more specifically can be measured by a method described in Examples of the present disclosure, for example.

The average particle diameter $D_{pi}$ of the fed powder is not particularly limited, except that the average particle diameter $D_{pi}$ of the fed powder is so set that the operation performance evaluation index f as defined by the formula (A) will be within the predetermined range. However, because a larger average particle diameter $D_{pi}$ results in a greater heat capacity per particle, thereby facilitating avoiding a temperature increase of the particles, the average particle diameter $D_{pi}$ may be preferably 50 μm or greater, more preferably 100 μm or greater, or further preferably 300 μm or greater.

The average particle diameter $D_{pi}$ of the fed powder may be, for example, adjusted by configuring the production method to comprise, before the step (1), the pre-polymerization step, the olefin pre-preparation polymerization step, and/or the like, and appropriately setting conditions of these steps as appropriate, or by the like adjustment.

The total amount $C_o$ [mass fraction] of comonomer-derived structural units in a polymer of discharged powder The total amount $C_o$ of comonomer-derived structural units in a polymer of discharged powder (the ethylene-derived structural unit and the C4-C12 α-olefin-derived structural units) may be measured by a conventional known method such as Infrared (IR) spectrometry, and can be measured by a method described in Examples of the present disclosure, for example.

The amount $C_o$ of comonomer-derived structural units in a polymer of discharged powder is not particularly limited, except that the total amount $C_o$ of comonomer-derived structural units in a polymer of discharged powder is so set that the operation performance evaluation index f as defined by the formula (A) will be within the predetermined range. For the sake of reducing the generation of agglomerates, for example, the amount $C_o$ may be preferably 50 wt % or less, or more preferably 30 wt % or less. In case where comonomer is ethylene, an amount C2' of the ethylene-derived structural unit may be further preferably 10 wt % or less.

The amount $C_o$ of comonomer-derived structural units in a polymer of discharged powder can be appropriately adjusted by changing amounts and a ratio of the comonomers supplied to the gas phase polymerization reactor (i).

The average polymerization rate of the step (1) is preferably not less than 10000 g/(g·hour) but not more than 25000 g/(g·hour).

Average Polymerization Rate of Step (1)=Total Amount of Propylene Homopolymer (I-1) and/or Propylene Copolymer (I-2) Generated by Gas Phase Polymerization per 1 g of Solid Catalyst Component/Average Retention Time of Whole Gas Phase Polymerization of Step (1)

[Step (2)]

The Step (2) according to the present embodiment is the step of copolymerizing propylene and at least one olefin selected from the group consisting of ethylene and C4 to C12 α-olefins, in the presence of the propylene homopolymer (I-1) and/or the propylene copolymer (I-2) that are obtained in the step (1) with at least one gas phase polymerization reactor, so as to produce the described-above propylene copolymer (II).

In the step (2), the propylene homopolymer (I-1) and/or propylene copolymer (I-2) obtained in the step (1) is supplied to the gas phase polymerization reactor(s) preferably in a continuous manner, and the copolymerization of propylene and at least one olefin selected from the group consisting of ethylene and C4 to C12 α-olefins is carried out in a gas phase in the presence of the polymer(s).

The average polymerization rate of the step (2) is preferably not less than 5000 g/(g·hour) but not more than 25000 g/(g·hour).

Average Polymerization Rate of Step (2)=Mass of Propylene Copolymer (II) Generated per 1 g of Solid Catalyst Component/Average Retention Time of the whole gas phase polymerization of Step (2)

According to the production method of the present embodiment, a heterophasic propylene polymer material is obtained generally, in the step (2), in a form of a mixture in which the propylene copolymer (II) is dispersed in a matrix of the propylene homopolymer (I-1) or the propylene copolymer (I-2).

Polymerization temperatures at the gas phase polymerization reactors in the steps (1) and (2) according to the present embodiment are generally in a range of 0 to 120° C., preferably in a range of 20 to 100° C., or more preferably in a range of 40 to 100° C.

Polymerization pressures at the gas phase polymerization reactors in the steps (1) and (2) according to the present embodiment are within such a range that the olefins can be present as gas phase in the gas phase polymerization reactors, and the polymerization pressures are generally in a range of atmospheric pressure to 10 MPaG, preferably in a range of 0.2 to 8 MPaG, or more preferably in a range of 0.5 to 5 MPaG.

Examples of the olefin polymerization catalyst (preferably propylene polymerization catalyst) for use in producing the heterophasic propylene polymer material in the steps (1) and (2) according to the present embodiment include Ziegler-Natta catalysts and metallocene catalysts, among which Ziegler-Natta catalysts are preferably. Examples of such Ziegler-Natta catalysts include Ti—Mg catalysts such as solid catalyst components obtainable by contacting a magnesium compound with a titanium compound, solid catalyst components obtainable by contacting a magnesium compound with a titanium compound, catalysts comprising an organic aluminum compound and, if necessary, a third component such as an electron-doner compound, and the like catalysts, among which the solid catalyst components obtainable by contacting a magnesium compound with a titanium compound, and the catalysts comprising an organic aluminum compound and, if necessary, a third component such as an electron-doner compound are preferable, and solid catalysts component obtainable by contacting a magnesium compound with a titanium halide and catalysts comprising an organic aluminum compound and a third component such as an electron-doner compound are more preferable. The catalyst may be a catalyst that is pre-activated by being contacted with a small amount of olefin.

Specific examples of the gas phase polymerization reactors include well-known polymerization reactors such as the reactors described in JP-A-58-201802, JP-A-59-0126406, JP-A-2-233708, and the like.

<Production Method of the Propylene Polymer>

One production method of the heterophasic propylene polymer material has been described above as one preferable embodiment of the production method of a propylene polymer according to the present disclosure, but the production method of a propylene polymer according to the present disclosure is not limited to the production method of the heterophasic propylene polymer material according to the embodiment.

That is, the production method of a propylene polymer according to the present disclosure is applicable not only to production of particular heterophasic propylene polymer material but also to productions of various propylene polymers (polymers comprising a monomer unit derived from propylene) such as propylene homopolymers, propylene copolymers, and heterophasic propylene polymer materials other than the heterophasic propylene polymer material of the above-described embodiment. In applying the production method according to the present disclosure, a person skilled in the art would be able to apply any of the features described in the preferable embodiment to production of a desired propylene polymer as appropriate, if the feature is applicable (as such or with necessary or preferable modification), according to the kind or characteristics of the propylene polymer to be produced.

Moreover, the production method of a propylene polymer according to the present disclosure is not required to comprise the step (1) and the step (2) as in the preferable embodiment, provided that the production method according to the present disclosure employs a polymerization system comprising two or more gas phase polymerization reactors or a polymerization system comprising a liquid phase polymerization reactor(s) and a gas phase polymerization reactor(s) in such a way that a total number of the liquid phase polymerization reactor(s) and the gas phase polymerization reactor(s) is three or more, where the two or more gas phase polymerization reactors and the gas phase polymerization reactor(s) preferably comprise at least one gas phase polymerization reactor that is the gas phase polymerization reactor (i) for the first gas phase polymerization. In putting the production method according to the present disclosure into practice out of the scope of the preferable embodiment, a person skilled in the art would be able to apply, as appropriate, any of the features (especially the features of step (I)) described in the preferable embodiment to a production method of a propylene polymer comprising desired steps, if the feature is applicable (as such or with necessary or preferable modification).

<Use of Propylene Polymer Material>

The propylene polymer obtainable by the production method according to the present disclosure, such as the heterophasic propylene polymer material, is appropriately moldable by, for example, a molding method such as extraction molding, injection molding, compression molding, foam molding, hollow molding, blow molding, vacuum molding, powder molding, calendar molding, inflation molding, or press molding.

The propylene polymers obtainable by the production method according to the present disclosure, such as the heterophasic propylene polymer material, are not limited to particular applications but are applicable to, for example, automobile parts such as automobile interior and exterior parts, containers for food and medical uses, parts of furniture and electric devices, civil engineering and building materials, and the like. Examples of the interior parts of automobiles include instrumental panels, trims, door panels, side protector, console boxes, column covers, and the like. Examples of the exterior parts of automobiles include bumpers, fenders, wheel cover, and the like. Examples of the food and medical containers include plastic wraps, food containers, infusion solution bags, infusion solution bottles, and the like. Examples of parts of the furniture and home appliances include wall paper, flooring materials, flexible decorative laminates, drainage hoses for washing machines, and the like. Examples of the civil engineer and building materials include water-proof sheets, leakage isolation sheets, hoses, ducts, gaskets, and the like.

EXAMPLES

In the following, the present disclosure will be described in more detail, referring to Examples and Comparative Examples. It should be noted that the technical scope of the present disclosure is not limited to these Examples by any means.

Measurement values given in Examples and Comparative Examples were measured under the following conditions.

(Holdup Amount HU: kg-bed)

Holdup amounts HU (kg) were calculated out according to the following equation (B) from pressure losses $\Delta pf$ [Pa] due to the fluidized beds, where the pressure losses were differences (differential pressures) between pressure at a bottom part of the fluidized bed and pressure at a top part of the fluidized bed.

More specifically, an inlet for a differential pressure gauge for the bottom part of the fluidized bed was provided right above a diffusion plate (preferably within 0.3 m above from the diffusion plate), and an inlet for a differential pressure gauge for the top part of the fluidized bed was provided at a place where was above the fluidized bed and a bed powder was not present (for example, at an upper edge of the reactor). By using the differential pressure gauges, a pressure difference between the two points was measured From the pressure difference (pressure loss $\Delta pf$ [Pa]) thus obtained, a cross-sectional area A (m$^2$) of the gas phase polymerization reactor at a height at which the fluidized bed was present, and the gravitational acceleration g (m/s$^2$), the holdup amount HU (kg-bed) was calculated out according to the following formula (B).

[Math. 6]
$$\Delta p_f = \frac{HU \cdot g}{A} \quad \sim(B)$$

(Production Amount: kg/Hour)

By using a circulating gas flow amount U [kg/hour], a temperature difference $\Delta T$ [° C.] between a gas temperature at an inlet of the reactor and an internal temperature of the reactor, circulating gas specific heat Cp [kcal/kg·° C.], and monomer reaction heat $\Delta Hr$ [kcal/kg], a production amount (kg/hour) was calculated out according to the following formula (C).

[Math. 7]
$$\text{Production Amount} = \frac{U \cdot Cp \cdot \Delta T}{\Delta Hr} \quad -(C)$$

(Space Time Yield: kg/kg-bed·Hour)

The production amount (kg/hour) thus obtained was divided by the holdup amount HU (kg-bed) thus obtained, thereby calculating out a space time yield (kg/kg-bed·hour).

(Average Retention Time $\tau_G$: Hour)

An average retention time could be obtained by the following equation, where the calculation of the retention time used a total production amount comprising production amounts of reactors preceding the reactor in question, unlike the calculation of the space time yield.

Average retention time $\tau_G$ [hour]=HU [kg]/Total Production Amount [kg/hour]

where the total production amount herein is a total of powder amounts polymerized by the reactor in question and all the reactors up to the reactor in question.

(Average Particle Diameter $D_{pi}$ of Fed Powder)

The powder particle diameters were measured by using a laser diffraction particle diameter distribution measuring device (device name: HELOS/KF, sample diffusing device: GRADIS+VIBRI, manufactured by Sympatec GmbH).

A particle diameter distribution was measured with a sample diffusion condition set to "GRADIS vib 50," a measurement range was set to "0 to 3500 µm," and a sample of about 1 to 10 g fed to the device per one measurement.

(Note that a sample of powder with poor flowability was measured with a sample diffusion condition for facilitating the diffusion). Measurement data was analyzed by using analyzing software for this purpose (WINDOX ve5.3.1.0) to calculate out a median diameter ($D_{50}$) based on volume. Moreover, each sample was measured three to five times and an average of the measurement was taken as an average particle diameter of the powder.

(Amount $C_o$ of Structural Unit Derived from Comonomer in Polymer: wt %)

According to the IR spectrometry measurement described on "*Kobunshi Handbook* (Polymer Handbook)(1995, published by KINOKUNIYA Company Ltd.), page 619, a total ratio of the structural unit derived from ethylene and the structural units derived from C4 to C12 α-olefins in all the structural units in the polymer was worked out by the IR spectrometry.

(Operation Performance Evaluation Index f)

From the average retention time $\tau_G$ [hour], the average particle diameter $D_{pi}$ [µm] of the fed powder, and the total amount $C_o$ [wt %] of the ethylene-derived structural unit and the C4 to C12 α-olefin-derived structural unit in the polymer of the discharged powder described above, the operation performance evaluation index f was calculated out according to the formula (A).

[Math. 8]

$$f=(\exp(C_o))^a \cdot \tau_G^b \cdot D_{pi}^c \quad (A)$$

where a=−0.50, b=2.50, and c=0.65.

(Operation Performance)

Evaluation of operation performance was carried out as follows.

Operation Performance GOOD: Continuous production was stably conducted without generation of agglomerates exceeding 1 inch inside the gas phase polymerization reactor.

Operation Performance POOR: Production could not be conducted stably due to poor flowability of the particles inside the gas phase polymerization reactor, resulting in poor discharge from the reactor and generation of agglomerates in the reactor.

Example 1

[Preparation of Olefin Polymerization Catalyst (Solid Catalyst Component)

Step (0-1A): After a 100-mL flask provided with a stirring device, a dropping funnel, and a thermometer was purged with nitrogen, 36.0 mL of toluene and 22.5 mL of titanium tetrachloride were added in the flask and stirred. After the temperature inside the flask was brought to 0° C., 1.88 g of magnesium ethoxide was added therein four times every 30 min at 0° C., and stirred for 1.5 hours at 0° C. Then, 0.60 mL of 2-ethoxymethyl-3,3-dimehtylethylbutyrate was added in the flask and the temperature inside the flask was increased to 10° C. After that, the content was stirred at 10° C. for two hours, and then 9.8 mL of toluene was added. Then, the temperature inside the flask was increased at a rate of 1.2 K/min, and 3.15 mL of 2-ethoxymethyl-3,3-dimentyethylbutanoate was added in the flask when the temperature reached 60° C. After that, the temperature inside the flask was increased to 110° C. Then, at 110° C., the components thus added in the flask were stirred for three hours.

A mixture thus obtained was subject to solid-liquid separation, thereby obtaining a solid. The solid was washed with 56.3 mL of toluene three times at 100° C.

Step (0-1B): Into the solid thus washed, 38.3 mL of toluene was added, thereby forming a slurry. To the slurry, 15.0 mL of titanium tetrachloride and 0.75 mL of ethyl 2-ethoxymethyl-3,3-dimethyl butanoate were introduced, thereby obtaining a mixture, and the mixture was stirred at 110° C. for one hour. After that, the mixture thus stirred was subjected to solid-liquid separation, and a solid thus obtained was washed with 56.3 mL of toluene at 60° C. three times, and then further washed with 56.3 mL of hexane at room temperature three times. The solid thus washed was dried under reduced pressure, thereby obtaining an olefin polymerization solid catalyst component. The solid catalyst component was such that titanium atom content was 2.53 wt %, ethoxy group content was 0.44 wt %, internal electron doner content was 13.7 wt %, and a median particle diameter measured by the laser diffraction and scattering methods was 59.5 µm.

[Pre-Polymerization (Step (0-2))]

Into an SUS-made autoclave with 3-L internal capacity and a stirring device, 1.8 L of n-hexane, 170 mmol of triethyl aluminum, and 17 mmol of t-butyl-n-propylmethoxysilane that had been sufficiently dehydrated and deaerated were placed. Into the content of the autoclave, 86 g of the polymerization solid catalyst component was added. Pre-polymerization was carried out with the mixture into which 86 g of propylene was continuously added therein over about 50 min in the autoclave in which temperature was kept at about 10° C., thereby obtaining a pre-polymerization slurry. After that, the pre-polymerization slurry was transferred to an SUS316L-made autoclave with an internal capacity of 150 L and a stirring device, and 100 L of liquid butane was added in the pre-polymerization slurry, thereby obtaining a slurry of the pre-polymerization catalyst component.

[Liquid Phase Polymerization Using Olefin Pre-Preparation Polymerization Reactor]

Liquid phase polymerization was carried out with two slurry polymerization reactors of a SUS304-made vessel type provided with a stirring device connected in tandem. That is, the polymerization reaction was carried out, continuously supplying propylene, ethylene, hydrogen, triethyl aluminum, tert-butyl-n-propyldimethoxysilane, and the slurry of the pre-polymerization catalyst component thus obtained to the reactors. Reaction conditions of the polymerization reaction were as follows.

(First Slurry Polymerization Reactor)

Polymerization Temperature: 56° C.
Stirring Speed: 150 rpm
Liquid Level in Reactor: 55 L
Amount of Propylene Supplied: 86 kg/hour
Amount of Ethylene Supplied: 0.1 kg/hour
Amount of Hydrogen Supplied: 3 NL/hour
Amount of Triethyl Aluminum Supplied: 230 mmol/hour
Amount of t-butyl-n-propyldimethoxysilane Supplied: 45 mmol/hour Slurry of Pre-polymerization Catalyst Component Supplied (based on the polymerization catalyst component): 3.6 g/hour
Polymerization Pressure: 2.6 MPa (Gauge Pressure)
(Second Slurry Polymerization Reactor)
Polymerization Temperature: 50° C.
Stirring Speed: 150 rpm
Liquid Level in Reactor: 60 L
Polymerization Pressure: 2.4 MPa (Gauge Pressure)
(The supply of the catalyst, the monomers, and hydrogen to the second reactor was only from the transfer from the first reactor.)

In the reactors, an average retention time of the slurry of the sum of the two reactors was 0.64 hours, an amount of the polypropylene particles thus discharged was 14 kg/hour, and the average particle diameter Dpi of the polypropylene particles thus discharged was 1064 μm. Moreover, the amount of ethylene contained in an ethylene-propylene copolymer thus polymerized in the liquid phase was 0.5 wt %.

An average polymerization rate in the pre-preparation polymerization calculated from these results was 5885 (g/g/hour).

[Gas Phase Polymerization by Fluidized Bed Polymerization Reactor (Gas Phase Polymerization in First Gas Phase Polymerization Reactor (i))]

By using a fluidized bed reactor, ethylene and propylene were copolymerized in gas phase.

Into the fluidized bed reactor from the slurry polymerization reactor preceding thereto, a slurry comprising the polypropylene particles, liquid propylene, and unreacted ethylene was continuously supplied without deactivating the catalyst. As described above, the average particle diameter of the polypropylene particles was 1064 μm, and thus the average particle diameter $D_{pi}$ of the powder supplied to the fluidized bed reactor was 1064 μm.

From a bottom part of the fluidized bed reactor, propylene, ethylene, and hydrogen were continuously supplied as gas. Ethylene and propylene were copolymerized with the gas forming a fluidized bed as fluidized gas with a gas composition and pressured kept constant by controlling the amount of propylene, ethylene and hydrogen supplied and purging excess gas. Reaction conditions of the polymerization reaction were as follows.
Polymerization Temperature: 70° C.
Polymerization Pressure: 1.84 MPa (Gauge Pressure)
Holdup Amount HU of Polypropylene Particles: 30 kg
Production Amount of Ethylene-Propylene Copolymer Polymerized by First Gas Phase Polymerization Reactor (i): 31 kg/hour
Space Time Yield of First Gas Phase Polymerization Reactor (i): 1.0 kg-PP/(kg-bed·hour)
Operation Performance Evaluation Index f in First Gas Phase Polymerization Reactor (i) calculated according to Formula (A): 33.7
Production Amount of Ethylene-Propylene Copolymer Discharged from Fluidized Bed Reactor Acting as First Gas Phase Polymerization Reactor (i): 45 kg/hour In the reactor, the average retention time was 0.67 hours, a hydrogen concentration ratio (hydrogen/(hydrogen+ethylene propylene)) in the gas inside the reactor was 4.9 mol %, and ethylene concentration ratio (ethylene/(ethylene+propylene) was 3.8 mol %. The amount of the polymer particles discharged was 44.5 kg/hour.

The average polymerization rate in Step (1) calculated from these results was 12525 (g/g/hour).

Tables 1 and 2 show conditions and results.

The evaluation result of the operation performance was good (o), and the polymerization could be conducted with a high productivity and good operation performance without generation of agglomerates in the first gas phase polymerization reactor (i).

The space time yield 1.0 (kg/kg-bed·hour) indicates that the catalytic activity was high in the first gas phase polymerization reactor (i) and that the polymer particles discharged from the first gas phase polymerization reactor (i) had a catalytic activity enough to further allow the gas phase polymerization of the propylene copolymer (II) in the presence of the polymer particles. For example, it is possible to obtain a heterophasic propylene polymer material by conducting the gas phase polymerization of the propylene copolymer (II) as follows.

[Step (2): Polymerization of Propylene Copolymer (II) by Fluidized Bed Polymerization Reactor]

By using a fluidized bed reactor, propylene and ethylene are copolymerized in gas phase.

The particles obtained in the polymerization step (1) are continuously supplied to the fluidized bed reactor in the downstream without deactivating the catalytic activity.

Propylene, ethylene, and hydrogen were supplied as gas continuously from a bottom part of the fluidized bed reactor in the downstream. Ethylene and propylene were copolymerized with the gas forming a fluidized bed as fluidized gas with a gas composition and pressured kept constant by controlling the amount of propylene, ethylene, and hydrogen supplied and purging excess gas. In this way, a heterophasic propylene polymer material is obtained. Reaction conditions of the copolymerization are as follows.
Polymerization Temperature: 70° C.
Polymerization Pressure: 1.95 MPa (Gauge Pressure)
Holdup Amount of Polypropylene Particles: 159 kg
Average Retention time: 1.7 hours
Hydrogen Concentration Ratio (Hydrogen/(Hydrogen Ethylene Propylene)) in Gas inside Reactor: 25 mol %
Ethylene Concentration Ratio (Ethylene/(Ethylene Propylene)): 3.9 mol %

The production Amount of the propylene-ethylene copolymer produced in the polymerization step (2) is 47 kg/hour, and the heterophasic propylene polymer material particles discharged is 94 kg/hour. In the heterophasic propylene polymer material particles, the content of the propylene-ethylene copolymer is 51 wt % and the content of the ethylene unit in the propylene-ethylene copolymer is 5 wt %.

From these, the average polymerization rate of the step (2) is calculated out to be 7645 (g/g/hour).

Comparative Example 1

By using an olefin polymerization solid catalyst component produced in the same manner as in Example 1, pre-polymerization and liquid phase polymerization using an olefin pre-preparation polymerization reactor were carried out as in Example 1, except that an average retention time of a slurry in the liquid phase polymerization was changed to 0.66 hours and an amount of a slurry of the pre-polymerization catalyst component supplied in the liquid phase (based on the polymerization catalyst component) was changed to 5.2 g/hour, thereby obtaining polypropylene particles. An average particle diameter of the polypropylene particles discharged was 1071 μm.

Next, gas phase polymerization using a fluidized bed polymerization reactor (gas phase polymerization using a first gas phase polymerization reactor (i)) was carried out as in Example 1, except that polymerization conditions were changed as shown in Table 1. Tables 1 and 2 show results.

The result of the operation performance evaluation was poor (x), and the operation was not stable due to the poor flowability of the particles inside the first gas phase polymerization reactor (i), which resulted in poor discharge from the reactor and generation of agglomerates inside the reactor.

Example 2

[Liquid Phase Polymerization Using Olefin Pre-Preparation Polymerization Reactor]

Using a pre-polymerization catalyst component pre-polymerized as in Example 1, liquid phase polymerization was carried out with three slurry polymerization reactors of SUS304-made vessel type provided with a stirring device and connected in tandem.

That is, the polymerization reaction was carried out, continuously supplying propylene, ethylene, hydrogen, triethyl aluminum, tert-butyl-n-propyldimethoxysilane, and the slurry of the pre-polymerization catalyst component thus obtained to the reactors. Reaction conditions of the polymerization reaction were as follows.
(First Slurry Polymerization Reactor)
Polymerization Temperature: 55° C.
Stirring Speed: 150 rpm
Liquid Level in Reactor: 25 L
Amount of Propylene Supplied: 40 kg/hour
Amount of Ethylene Supplied: 0.1 kg/hour
Amount of Hydrogen Supplied: 25 NL/hour
Amount of Triethyl Aluminum Supplied: 200 mmol/hour
Amount of t-butyl-n-propyldimethoxysilane Supplied: 40 mmol/hour
Slurry of Pre-polymerization Catalyst Component Supplied (based on the polymerization catalyst component): 1.8 g/hour
Polymerization Pressure: 3.4 MPa (Gauge Pressure) (Second Slurry Polymerization Reactor)
Polymerization Temperature: 53° C.
Stirring Speed: 150 rpm
Liquid Level in Reactor: 55 L
Amount of Propylene Supplied: 40 kg/hour
Amount of Ethylene Supplied: 0.1 kg/hour
Amount of Hydrogen Supplied: 23 NL/hour
Polymerization Pressure: 2.9 MPa (Gauge Pressure)
(Component not described was only from the transfer from the first reactor.)
(Third Slurry Polymerization Reactor)
Polymerization Temperature: 43° C.
Stirring Speed: 150 rpm
Liquid Level in Reactor: 55 L
Polymerization Pressure: 2.5 MPa (Gauge Pressure)
(The supply of the catalyst, the monomers, and hydrogen to the third reactor was only from the transfer from the second reactor.)

In the reactors, an average retention time of the slurry of the sum of the three reactors was 0.98 hours, an amount of the polypropylene particles thus discharged was 16 kg/hour, and the average particle diameter $D_{pi}$ of the polypropylene particles thus discharged was 1395 μm. Moreover, the amount of ethylene contained in an ethylene-propylene copolymer thus polymerized in the liquid phase was 1.5 wt %.

An average polymerization rate in the pre-preparation polymerization calculated from these results was 8696 (g/g/hour).

[Gas Phase Polymerization by Spouted Bed Polymerization Reactor (Gas Phase Polymerization in First Gas phase Polymerization Reactor (i))

By using not a fluidized bed reactor but a spouted bed reactor, ethylene and propylene were copolymerized in gas phase in this example.

Into the spouted bed reactor from the slurry polymerization reactor preceding thereto, a slurry comprising the polypropylene particles, liquid propylene, and unreacted ethylene was continuously supplied without deactivating the catalyst.

From a bottom part of the spouted bed reactor, propylene, ethylene, and hydrogen were continuously supplied as gas. Ethylene and propylene were copolymerized with the gas forming a spouted bed as fluidized gas with a gas composition and pressured kept constant by controlling the amount of propylene, ethylene, and hydrogen and purging excess gas. Reaction conditions of the polymerization reaction were as follows.
Polymerization Temperature: 70° C.
Polymerization Pressure: 1.81 MPa (Gauge Pressure)
Holdup Amount HU of Polypropylene Particles: 37 kg
Production Amount of Ethylene-Propylene Copolymer Polymerized by First Gas Phase Polymerization Reactor (i): 29 kg/hour
Space Time Yield of First Gas Phase Polymerization Reactor (i): 0.8 kg-PP/(kg-bed·hour)
Operation Performance Evaluation Index f in First Gas Phase Polymerization Reactor (i) calculated according to Formula (A): 65.3
Production Amount of Ethylene-Propylene Copolymer Discharged from Fluidized Bed Reactor Acting as First Gas Phase Polymerization Reactor (i): 45 kg/hour In the reactor, the average retention time was 0.82 hours and a hydrogen concentration ratio (hydrogen/(hydrogen+ethylene+propylene)) in the gas inside the reactor was 1.5 mol %, and ethylene concentration ratio (ethylene/(ethylene propylene) was 4.5 mol %. The amount of the polymer particles discharged was 44.8 kg/hour.

The average polymerization rate in Step (1) calculated from these results was 19575 (g/g/hour).

Tables 1 and 2 show the conditions and results.

The evaluation result of the operation performance was good (o), and the polymerization could be conducted with a high productivity and good operation performance without generation of agglomerates in the first gas phase polymerization reactor (i).

The space time yield 0.8 (kg/kg-bed·hour) indicates that the catalytic activity was high in the first gas phase polymerization reactor (i) and is determined that the polymer particles discharged from the first gas phase polymerization reactor (i) has a catalytic activity enough to further allow the gas phase polymerization of the propylene copolymer in the presence of the polymer particles.

Further, the average polymerization rate in Step (2) calculated as in Example 1 was 7579 (g/g/hour).

Example 3

[Liquid Phase Polymerization Using Olefin Pre-Preparation Polymerization Reactor]

As in Example 2, liquid phase polymerization was carried out with three slurry polymerization reactors of an SUS304-made vessel type provided with a stirring device connected in tandem. However, in this example, the liquid phase homopolymerization was carried out with propylene. That is, the polymerization reaction was carried out, continuously supplying propylene, hydrogen, triethyl aluminum, tert-butyl-n-propyldimethoxysilane, and the slurry of the pre-polymerization catalyst component thus obtained to the reactors. Reaction conditions of the polymerization reaction were as follows.

(First Slurry Polymerization Reactor)
  Polymerization Temperature: 55° C.
  Stirring Speed: 150 rpm
  Liquid Level in Reactor: 25 L
  Amount of Propylene Supplied: 70 kg/hour
  Amount of Hydrogen Supplied: 43 NL/hour
  Amount of Triethyl Aluminum Supplied: 150 mmol/hour
  Amount of t-butyl-n-propyldimethoxysilane Supplied: 30 mmol/hour
  Slurry of Pre-polymerization Catalyst Component Supplied (based on the polymerization catalyst component): 2.2 g/hour
  Polymerization Pressure: 2.9 MPa (Gauge Pressure) (Second Slurry Polymerization Reactor)
  Polymerization Temperature: 51° C.
  Stirring Speed: 150 rpm
  Liquid Level in Reactor: 55 L
  Amount of Propylene Additionally Supplied: 85 kg/hour
  Amount of Hydrogen Additionally Supplied: 51 NL/hour
  Polymerization Pressure: 2.7 MPa (Gauge Pressure)
  (Component not described was only from the transfer from the first reactor.)
(Third Slurry Polymerization Reactor)
  Polymerization Temperature: 43° C.
  Stirring Speed: 150 rpm
  Liquid Level in Reactor: 55 L
  Polymerization Pressure: 2.3 MPa (Gauge Pressure)
  (The supply of the catalyst, the monomers, and hydrogen to the third reactor was only from the transfer from the second reactor.)

In the reactors, an average retention time of the slurry of the sum of the three reactors was 0.50 hours, an amount of the polypropylene particles thus discharged was 11 kg/hour, and the average particle diameter $D_{pi}$ of the polypropylene particles thus discharged was 1150 µm.

An average polymerization rate in the pre-preparation polymerization calculated from these results was 9427 (g/g/hour).

[Gas Phase Polymerization by Spouted Bed Polymerization Reactor (Gas Phase Polymerization in First Gas Phase Polymerization Reactor (i))]

As in Example 2, propylene was homopolymerized in gas phase, using a spouted bed polymerization reactor.

Into the spouted bed reactor from the slurry polymerization reactor preceding thereto, a slurry comprising the polypropylene particles and liquid propylene was continuously supplied without deactivating the catalyst.

From a bottom part of the spouted bed reactor, propylene and hydrogen were continuously supplied as gas. Propylene was polymerized with the gas forming a spouted bed as fluidized gas with a gas composition and pressured kept constant by controlling the amount of propylene and hydrogen and purging excess gas. Reaction conditions of the polymerization reaction were as follows.
  Polymerization Temperature: 80° C.
  Polymerization Pressure: 1.80 MPa (Gauge Pressure)
  Holdup Amount HU of Polypropylene Particles: 35 kg
  Production Amount of Propylene Polymer Polymerized by First Gas Phase Polymerization Reactor (i): 37 kg/hour
  Space Time Yield of First Gas Phase Polymerization Reactor (i): 1.0 kg-PP/(kg-bed-hour)
  Operation Performance Evaluation Index f in First Gas Phase Polymerization Reactor (i) calculated according to Formula (A): 47.5
  Production Amount of Ethylene-Propylene Copolymer Discharged from Spouted Bed Reactor Acting as First Gas Phase Polymerization Reactor (i): 48 kg/hour In the reactor, the average retention time was 0.75 hours and a hydrogen concentration ratio (hydrogen/(hydrogen+propylene)) in the gas inside the reactor was 1.4 mol %.

The average polymerization rate in Step (1) calculated from these results was 22094 (g/g/hour).

Tables 1 and 2 show the conditions and results.

The evaluation result of the operation performance was good (o), and the polymerization could be conducted with a high productivity and good operation performance without generation of agglomerates in the first gas phase polymerization reactor (i).

The space time yield 1.0 (kg/kg-bed·hour) indicates that the catalytic activity was high in the first gas phase polymerization reactor (i) and is determined that the polymer particles discharged from the first gas phase polymerization reactor (i) has a catalytic activity enough to further allow the gas phase polymerization of the propylene copolymer in the presence of the polymer particles.

Further, the average polymerization rate in Step (2) calculated as in Example 1 was 7288 (g/g/hour).

Example 4

As in Example 1, liquid phase polymerization was carried out with two SUS304-made slurry polymerization reactors provided with a stirring device and connected in tandem and then gas phase polymerization was carried out with a fluidized bed reactor, except that a catalyst seed different from that in Example 1 was used and propylene homopolymerization was conducted unlike in Example 1. The polymerization catalyst used in Example 4 was the same catalyst used in Examples of JP-A-2016-50316.

[Pre-Polymerization]

Into an SUS-made autoclave with 3-L internal capacity and a stirring device, 1.8 L of n-hexane, 30 mmol of triethyl aluminum, and 3 mmol of t-butyl-n-propylmethoxysilane that had been sufficiently dehydrated and deaerated were placed. Into the content of the autoclave, 12 g of the polymerization solid catalyst component was added. Pre-polymerization was carried out with the mixture into which 24 g of propylene was continuously added therein over about 15 min in the autoclave in which temperature was kept at about 10° C., thereby obtaining a pre-polymerization slurry. After that, the pre-polymerization slurry was transferred to an SUS316L-made autoclave with an internal capacity of 150 L and a stirring device, and 100 L of liquid butane was added in the pre-polymerization slurry, thereby obtaining a slurry of the pre-polymerization catalyst component.

[Liquid Phase Polymerization Using Olefin Pre-Preparation Polymerization Reactor]

Liquid phase polymerization was carried out with two slurry polymerization reactors of a SUS304-made vessel type provided with a stirring device connected in tandem. That is, the polymerization reaction was carried out, continuously supplying propylene, hydrogen, triethyl aluminum, tert-butyl-n-propyldimethoxysilane, and the slurry of the pre-polymerization catalyst component thus obtained to the reactors. Reaction conditions of the polymerization reaction were as follows.

(First Slurry Polymerization Reactor)
 Polymerization Temperature: 79° C.
 Stirring Speed: 150 rpm
 Liquid Level in Reactor: 18 L
 Amount of Propylene Supplied: 43 kg/hour
 Amount of Hydrogen Supplied: 0 NL/hour
 Amount of Triethyl Aluminum sup Supplied lied: 41 mmol/hour
 Amount of t-butyl-n-propyldimethoxysilane Supplied: 6 mmol/hour
 Slurry of Pre-polymerization Catalyst Component Supplied (based on the polymerization catalyst component): 0.6 g/hour
 Polymerization Pressure: 3.6 MPa (Gauge Pressure)
(Second Slurry Polymerization Reactor)
 Polymerization Temperature: 64° C.
 Stirring Speed: 150 rpm
 Liquid Level in Reactor: 60 L
 Amount of Propylene Supplied: 2 kg/hour
 Amount of Hydrogen Supplied: 257 NL/hour
 Polymerization Pressure: 3.4 MPa (Gauge Pressure)
 (Component not Described was Only from the Transfer from the First Reactor.)

In the reactors, an average retention time of the slurry of the sum of the two reactors was 0.75 hours, an amount of the polypropylene particles thus discharged was 7 kg/hour, and the average particle diameter Dpi of the polypropylene particles thus discharged was 838

An average polymerization rate in the pre-preparation polymerization calculated from these results was 16722 (g/g/hour).

[Gas Phase Polymerization by Fluidized Bed Polymerization Reactor (Gas Phase Polymerization in First Gas Phase Polymerization Reactor (i))

By using a fluidized bed reactor, propylene was polymerized in gas phase.

Into the fluidized bed reactor from the slurry polymerization reactor preceding thereto, a slurry comprising the polypropylene particles, liquid propylene, and unreacted ethylene was continuously supplied without deactivating the catalyst.

From a bottom part of the fluidized bed reactor, propylene and hydrogen were continuously supplied as gas. Propylene was polymerized with the gas forming a fluidized bed as fluidized gas with a gas composition and pressured kept constant by controlling the amount of propylene and hydrogen and purging excess gas. Reaction conditions of the polymerization reaction were as follows.
 Polymerization Temperature: 75° C.
 Polymerization Pressure: 1.80 MPa (Gauge Pressure)
 Holdup Amount HU of Polypropylene Particles: 45 kg
 Production Amount of Propylene Polymer Polymerized by First Gas Phase Polymerization Reactor (i): 9.2 kg/hour
 Space Time Yield of First Gas Phase Polymerization Reactor (i): 0.2 kg-PP/(kg-bed·hour)
 Operation Performance Evaluation Index f in First Gas Phase Polymerization Reactor (i) calculated according to Formula (A): 961.5
 Production Amount of Ethylene-Propylene Copolymer Discharged from Fluidized Bed Reactor Acting as First Gas Phase Polymerization Reactor (i): 17 kg/hour In the reactor, the average retention time was 2.7 and a hydrogen concentration ratio (hydrogen/(hydrogen+ethylene+propylene)) in the gas inside the reactor was 6.0 mol %, and the amount of the polymer particles discharged was 16.6 kg/hour.

The average polymerization rate in Step (1) calculated from these results was 5772 (g/g/hour).

Tables 1 and 2 show the conditions and results.

The evaluation result of the operation performance was good (0), and the polymerization could be conducted with a high productivity and good operation performance without generation of agglomerates in the first gas phase polymerization reactor (i).

Further, the average polymerization rate in Step (2) calculated as in Example 1 was 4592 (g/g/hour).

Comparative Example 2

Liquid phase polymerization was carried out with a slurry polymerization reaction of an SUS304-made vessel type provided with a stirring device, with a slurry obtained under similar pre-polymerization conditions using the same catalyst seed as Examples 1 to 3 and Comparative Example 1, except that the gas phase polymerization was carried out with a fluidized bed reactor after the pre-preparation polymerization was carried out with a single liquid phase polymerization reactor.

[Liquid Phase Polymerization Using Olefin Pre-Preparation Polymerization Reactor]

Liquid phase polymerization was carried out with one slurry polymerization reactor of an SUS304-made vessel type provided with a stirring device connected in tandem. That is, the polymerization reaction was carried out, continuously supplying propylene, hydrogen, triethyl aluminum, tert-butyl-n-propyldimethoxysilane, and the slurry of the pre-polymerization catalyst component thus obtained to the reactors. Reaction conditions of the polymerization reaction were as follows.

(First Slurry Polymerization Reactor)
 Polymerization Temperature: 50° C.
 Stirring Speed: 150 rpm
 Liquid Level in Reactor: 25 L
 Amount of Propylene Supplied: 75 kg/hour
 Amount of Hydrogen Supplied: 2 NL/hour
 Amount of Triethyl Aluminum supplied: 223 mmol/hour
 Amount of t-butyl-n-propyldimethoxysilane Supplied: 46 mmol/hour
 Slurry of Pre-polymerization Catalyst Component Supplied (based on the polymerization catalyst component): 8.3 g/hour
 Polymerization Pressure: 2.6 MPa (Gauge Pressure)

An average retention time of the reactor was 0.15 hours and an amount of the polypropylene particles thus discharged was 4 kg/hour, and the average particle diameter Dpi of the polypropylene particles thus discharged was 542 µm.

An average polymerization rate in the pre-preparation polymerization calculated from these results was 3350 (g/g/hour).

[Gas Phase Polymerization by Fluidized Bed Polymerization Reactor (Gas Phase Polymerization in First Gas Phase Polymerization Reactor (i))

By using a fluidized bed reactor, propylene was polymerized in gas phase.

Into the fluidized bed reactor from the slurry polymerization reactor preceding thereto, a slurry comprising the polypropylene particles, liquid propylene, and unreacted ethylene was continuously supplied without deactivating the catalyst.

From a bottom part of the fluidized bed reactor, propylene and hydrogen were continuously supplied as gas. Propylene was polymerized with the gas forming a fluidized bed as fluidized gas with a gas composition and pressured kept constant by controlling the amount of propylene and hydrogen and purging excess gas. Reaction conditions of the polymerization reaction were as follows.

Polymerization Temperature: 79° C.
Polymerization Pressure: 1.94 MPa (Gauge Pressure)
Holdup Amount HO of Polypropylene particles: 44 kg
Production Amount of Propylene Polymer Polymerized by First Gas Phase Polymerization Reactor (i): 78.1 kg/hour in Comparative Example 2, except that polymerization conditions were changed as shown in Table 1. Tables 1 and 2 show results.

The result of the operation performance evaluation was poor (x), and the operation was not stable due to the poor flowability of the particles inside the first gas phase polymerization reactor (i), which resulted in poor discharge from the reactor and generation of agglomerates inside the reactor.

TABLE 1

|  | Particle Diameter of Fed Powder $D_{pi}$ (μm) | Comonomer Unit Content $C_o$ (wt %) | Average Retention Time $T_G$ (hour) | Operation Performance Evaluation Index f | Production Amount (kg/hour) | Operation Performance | Holdup Amount HU (kg-bed) | Gas Phase Polymerization Reactor | Space Time Yield (kg/kg-bed · hour) |
|---|---|---|---|---|---|---|---|---|---|
| Example 1 | 1064 | 0.051 | 0.67 | 33.7 | 45 | ○ | 30 | Fluifized Bed | 1.0 |
| Example 2 | 1395 | 0.064 | 0.82 | 65.3 | 45 | ○ | 37 | Spouted Bed | 0.8 |
| Example 3 | 1150 | 0.000 | 0.75 | 47.5 | 48 | ○ | 35 | Spouted Bed | 1.0 |
| Example 4 | 838 | 0.000 | 2.71 | 961.5 | 17 | ○ | 45 | Fluifized Bed | 0.2 |
| Comparative Example 1 | 1071 | 0.059 | 0.56 | 21.3 | 45 | × | 25 | Fluifized Bed | 1.0 |
| Comparative Example 2 | 542 | 0.000 | 0.54 | 12.5 | 82 | × | 44 | Fluifized Bed | 1.8 |
| Comparative Example 3 | 675 | 0.000 | 0.66 | 24.3 | 76 | × | 50 | Fluifized Bed | 1.4 |

Space Time Yield of First Gas Phase Polymerization Reactor (i): 1.8 kg-PP/(kg-bed·hour)

Operation Performance Evaluation Index f in First Gas Phase Polymerization Reactor (i) calculated according to Formula (A): 12.5

Production Amount of Propylene Polymer Discharged from Fluidized Bed Reactor Acting as First Gas Phase Polymerization Reactor (i): 82 kg/hour In the reactor, the average retention time was 0.54 hours and a hydrogen concentration ratio (hydrogen/(hydrogen+ ethylene+propylene)) in the gas inside the reactor was 1.4 mol %, and the amount of the polymer particles discharged was 82.3 kg/hour.

The average polymerization rate in Step (1) calculated from these results was 17545 (g/g/hour).

Tables 1 and 2 show the conditions and results.

The result of the operation performance evaluation was poor (x), and the operation was not stable due to the poor flowability of the particles inside the first gas phase polymerization reactor (i), which resulted in poor discharge from the reactor and generation of agglomerates inside the reactor.

Comparative Example 3

By using an olefin polymerization solid catalyst component produced in the same manner as in Comparative Example 2, pre-polymerization and liquid phase polymerization using an olefin pre-preparation polymerization reactor were carried out as in Example 1, except that an average retention time of a slurry in the liquid phase polymerization was changed to 0.16 hours and an amount of a slurry of the pre-polymerization catalyst component supplied in the liquid phase (based on the polymerization catalyst component) was changed to 6.3 g/hour, thereby obtaining polypropylene particles. An average particle diameter of the polypropylene particles discharged was 675 μm.

Next, gas phase polymerization using a fluidized bed polymerization reactor (gas phase polymerization using a first gas phase polymerization reactor (i)) was carried out as

TABLE 2

| | Average Polymerization Rate (g/g/hour) | | |
|---|---|---|---|
| | Pre-preparation Polymerization (Liquid phase polymerization) | Gas Phase Polymerization of Step (1) | Gas Phase Polymerization of Step (2) |
| Example 1 | 5885 | 12525 | 7645 |
| Example 2 | 8696 | 19575 | 7579 |
| Example 3 | 9427 | 22094 | 7288 |
| Example 4 | 16722 | 5772 | 4592 |
| Comparative Example 1 | 5847 | 8527 | — |
| Comparative Example 2 | 3350 | 17545 | — |
| Comparative Example 3 | 6121 | 16723 | — |

A propylene polymer obtainable according to the production method of the present disclosure is applicable as raw materials for, for example, automobile parts such as automobile interior and exterior parts, containers for food and medical uses, parts of furniture and electric devices, civil engineering and building materials, and the like. Therefore, the present disclosure is highly applicable to various industrial fields.

11, 31: a gas phase polymerization reactor at the step (1)
21, 311, 411: the gas phase polymerization reactor (i) for the first gas phase polymerization
312-316: a spouted bed gas phase polymerization reactor
317: a fluidized bed gas phase reactor
411-412: a horizontal reactor internally provided with a stirring device for rotating about a horizontal axis
12, 32, 42: a gas phase polymerization reactor at the step (2)
13, 23: fed powder
14, 24: the propylene homopolymer (I-1) and/or the propylene copolymer (I-2)
15: heterophasic propylene polymer material
16: the monomer(s) comprising propylene 17: the monomers comprise propylene and at least one olefin selected from the group consisting of ethylene and C4 to C12 α-olefins
38: a liquid phase polymerization reactor
29: powder bed (a bed section)
P1: pressure at top of the fluidized bed
P2: pressure at bottom of the fluidized bed

What is claimed is:

1. A method of producing a propylene polymer, comprising (co)polymerizing at least one monomer comprising propylene in a presence of an olefin polymerization catalyst with: (a) a polymerization system comprising two or more gas phase polymerization reactors, or (b) a polymerization system comprising at least one liquid phase polymerization reactor and at least one gas phase polymerization reactor such that a total number of the liquid phase polymerization reactors and the gas phase polymerization reactors in the polymerization system (a) or (b) is three or more, wherein
at least one gas phase polymerization reactor in the polymerization system (a) or (b) is such that an operation performance evaluation index f defined by the following formula (A) is not less than 30 and not more than 1250:

$$f = (\exp(C_o))^a \cdot \tau_G^b \cdot D_{pi}^c \quad (A)$$

where $\tau_G$ is an average retention time [hour] in a gas phase polymerization in question,
$D_{pi}$ is an average particle diameter [μm] of fed powder, and
$C_o$ is a total amount [wt %] of an ethylene-derived structural unit and C4-C12 α-olefin-derived structural units in a polymer in discharged powder,
where a=−0.50, b=2.50, and c=0.65.

2. The method according to claim 1, wherein the at least one gas phase polymerization reactor comprises a gas phase polymerization reactor (i) for first gas phase polymerization.

3. The method according to claim 2, comprising:
(1) (co)polymerizing the at least one monomer comprising propylene in the presence of the olefin polymerization catalyst in at least one gas phase polymerization reactor comprising the gas phase polymerization reactor (i) for the first gas phase polymerization, to produce a propylene homopolymer (I-1) and/or a propylene copolymer (I-2); and
(2) copolymerizing propylene and at least one olefin selected from the group consisting of ethylene and C4 to C12 α-olefins, in the presence of the propylene homopolymer (I-1) and/or the propylene copolymer (I-2) obtained in (1) in at least one gas phase polymerization reactor, to produce a propylene copolymer (II), wherein
the propylene copolymer (I-2) comprises a structural unit derived from propylene and a structural unit derived from the at least one olefin selected from the group consisting of ethylene and C4 to C12 α-olefins, such that a content of the structural unit derived from the at least one olefin selected from the group consisting of ethylene and C4 to C12 α-olefins is not less than 0.01 wt % and less than 15 wt %, where a total amount of the propylene copolymer (I-2) is 100 wt %,
the propylene copolymer (II) comprises a structural unit derived from propylene and a structural unit derived from the at least one olefin selected from the group consisting of ethylene and C4 to C12 α-olefins, such that a content of the structural unit derived from the at least one olefin selected from the group consisting of ethylene and C4 to C12 α-olefins is not less than 15 wt % and not more than 80 wt %, where a total amount of the propylene copolymer (II) is 100 wt %, and
the propylene polymer is a heterophasic propylene polymer material that comprises the propylene homopolymer (I-1) and/or the propylene copolymer (I-2), and the propylene copolymer (II) such that a content of the propylene copolymer (II) is 15 wt % or more, where a total amount of the heterophasic propylene polymer material is 100 wt %.

4. The method according to claim 3, comprising, before the (co)polymerization in the gas phase polymerization reactor (i) for the first gas phase polymerization:
(co)polymerizing the at least one monomer comprising propylene in a liquid phase polymerization reactor, to obtain a (co)polymer, in the presence of which the (co)polymerization with the gas phase polymerization reactor (i) for the first gas phase polymerization is carried out.

5. The method according to claim 1, wherein the at least one gas phase polymerization reactor comprises a fluidized bed reactor, a spouted bed reactor, or a horizontal reactor internally provided with a stirring device for rotating about a horizontal axis.

6. The method according to claim 3, wherein a content of the propylene copolymer (II) in the heterophasic propylene polymer material is 20 wt % or more.

7. The method according to claim 1, wherein the propylene polymer is for use as a material for an automobile part, a container for food or medical use, a part of furniture or electric device, or a civil engineering or building material.

* * * * *